(12) United States Patent
Gow et al.

(10) Patent No.: US 12,230,775 B2
(45) Date of Patent: *Feb. 18, 2025

(54) BATTERY PACKS WITH SAFETY FEATURES AND METHODS OF INSTALLING SUCH PACKS ON TRUCK FRAMES

(71) Applicant: Harbinger Motors Inc., Gardena, CA (US)

(72) Inventors: Phil Gow, Gardena, CA (US); Kenneth Kawanishi, Gardena, CA (US); Phillip John Weicker, Hermosa Beach, CA (US); Cody Rhebergen, Gardena, CA (US); John Henry Harris, III, Anaheim, CA (US); Vu Phan, Gardena, CA (US); Michael Carl Fricke, Culver City, CA (US); Daniel McCarron, Gardena, CA (US); Deborah Bourke, San Diego, CA (US)

(73) Assignee: Harbinger Motors Inc., Garden Grove, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,351

(22) Filed: Feb. 29, 2024

(65) Prior Publication Data

US 2024/0234851 A1    Jul. 11, 2024

Related U.S. Application Data

(63) Continuation of application No. 18/467,088, filed on Sep. 14, 2023, now Pat. No. 11,949,080, which is a
(Continued)

(51) Int. Cl.
*B60K 1/04* (2019.01)
*H01M 10/48* (2006.01)
(Continued)

(52) U.S. Cl.
CPC ............. *H01M 10/625* (2015.04); *B60K 1/04* (2013.01); *H01M 10/482* (2013.01);
(Continued)

(58) Field of Classification Search
CPC ............. H01M 10/625; H01M 10/482; H01M 10/486; H01M 10/63; H01M 10/6551;
(Continued)

(56) References Cited

U.S. PATENT DOCUMENTS 8,058,842 B2   11/2011   Kai et al.
8,207,704 B2    6/2012   Kai et al.
(Continued)

FOREIGN PATENT DOCUMENTS

CN    103038933 A    4/2013
KR    20140128396 A   11/2014
(Continued)

OTHER PUBLICATIONS

U.S. Appl. No. 18/467,088, Non Final Office Action mailed Dec. 14, 2023, 10 pgs.
(Continued)

*Primary Examiner* — Jason D Shanske
*Assistant Examiner* — James J Triggs
(74) *Attorney, Agent, or Firm* — Polygon IP, LLP

(57) ABSTRACT

Described herein are battery packs and electric vehicles using these packs. In some examples, a battery pack comprises two portions/covers and a set of battery modules positioned within the enclosed cavity formed by these portions. A battery pack may comprise a set of pressure-relief valves positioned in and protruding through a wall of at least one portion. Each valve can be coaxial with a corresponding gap provided between two adjacent modules. The valve is configured to provide a fluid path (to the exterior of the battery pack) when the pressure inside the
(Continued)

pack exceeds a set threshold. In some examples, the battery pack comprises an inlet tube fluidically coupled to the inlet port of each module and an outlet tube fluidically coupled to the outlet port of each module. A set of specially configured orifices or controllable valves is positioned on the fluid path through each module.

20 Claims, 18 Drawing Sheets

Related U.S. Application Data continuation of application No. PCT/US2023/073569, filed on Sep. 6, 2023.

(60) Provisional application No. 63/374,712, filed on Sep. 6, 2022, provisional application No. 63/374,708, filed on Sep. 6, 2022.

(51) Int. Cl.
*H01M 10/625* (2014.01)
*H01M 10/63* (2014.01)
*H01M 10/6551* (2014.01)
*H01M 10/6568* (2014.01)
*H01M 50/209* (2021.01)
*H01M 50/249* (2021.01)
*H01M 50/325* (2021.01)

(52) U.S. Cl.
CPC ......... *H01M 10/486* (2013.01); *H01M 10/63* (2015.04); *H01M 10/6551* (2015.04); *H01M 10/6568* (2015.04); *H01M 50/209* (2021.01); *H01M 50/249* (2021.01); *H01M 50/325* (2021.01); *H01M 2220/20* (2013.01)

(58) Field of Classification Search
CPC ............. H01M 50/209; H01M 50/249; H01M 50/325; H01M 2220/20
See application file for complete search history.

(56) References Cited

U.S. PATENT DOCUMENTS

| | | | |
|---|---|---|---|
| 8,785,027 B2 | 7/2014 | Soong et al. |
| 8,888,506 B2 | 11/2014 | Nishimura et al. |
| 9,139,104 B2 | 9/2015 | Chung et al. |
| 9,444,082 B2 | 9/2016 | Tsujimura et al. |
| 9,564,664 B2 | 2/2017 | Tanigaki et al. |
| 9,592,738 B1 | 3/2017 | Paryani et al. |
| 9,647,361 B2 | 5/2017 | Kobuchi et al. |
| 9,692,095 B2 | 6/2017 | Harris |
| 9,692,096 B2 | 6/2017 | Harris |
| 9,742,043 B2 | 8/2017 | Tanigaki et al. |
| 9,995,535 B2 | 6/2018 | Harris |
| 9,995,536 B2 | 6/2018 | Harris |
| 10,236,791 B1 | 3/2019 | Chung et al. |
| 10,256,514 B2 | 4/2019 | Obasih et al. |
| 10,263,407 B1 | 4/2019 | Song et al. |
| 10,407,004 B2 | 9/2019 | Harris et al. |
| 10,505,163 B2 | 12/2019 | Harris |
| 10,516,194 B2 | 12/2019 | Zhou et al. |
| 10,585,828 B2 | 3/2020 | Paryani et al. |
| 10,594,230 B2 | 3/2020 | Chung et al. |
| 10,668,832 B2 | 6/2020 | Capati et al. |
| 10,756,649 B2 | 8/2020 | Chung et al. |
| 10,778,118 B2 | 9/2020 | Chung et al. |
| 10,779,445 B2 | 9/2020 | Chung et al. |
| 10,826,042 B2 | 11/2020 | Harris et al. |
| 10,826,140 B2 | 11/2020 | Harris et al. |
| 10,886,512 B2 | 1/2021 | Bourke et al. |
| 10,892,528 B2 | 1/2021 | Yoo et al. |
| 10,950,884 B2 | 3/2021 | Offutt et al. |
| 11,108,100 B2 | 8/2021 | Harris et al. |
| 11,158,890 B2 | 10/2021 | Thomas et al. |
| 11,183,729 B2 | 11/2021 | He et al. |
| 11,258,104 B2 | 2/2022 | Chidester et al. |
| 11,522,236 B2 | 12/2022 | Thomas et al. |
| 11,529,859 B2 | 12/2022 | Sampson et al. |
| 11,949,080 B2 * | 4/2024 | Gow .................. H01M 50/325 |
| 11,961,987 B2 | 4/2024 | Gow et al. |
| 2004/0227231 A1 | 11/2004 | Maly et al. |
| 2006/0274561 A1 | 12/2006 | Ahmed et al. |
| 2010/0025126 A1 | 2/2010 | Nakatsu et al. |
| 2013/0146524 A1 | 6/2013 | Veit et al. |
| 2018/0330895 A1 | 11/2018 | Nagayoshi et al. |
| 2018/0358667 A1 | 12/2018 | Harris et al. |
| 2020/0358061 A1 | 11/2020 | Mostofi et al. |
| 2020/0411819 A1 | 12/2020 | Seki et al. |
| 2021/0074969 A1 | 3/2021 | Bourke et al. |
| 2021/0184287 A1 | 6/2021 | Harris et al. |
| 2021/0184290 A1 | 6/2021 | Sweet et al. |
| 2021/0194035 A1 | 6/2021 | Offutt et al. |
| 2021/0359359 A1 | 11/2021 | Harris et al. |
| 2021/0376411 A1 | 12/2021 | Yen et al. |
| 2022/0247014 A1 | 8/2022 | Harris et al. |
| 2022/0289067 A1 | 9/2022 | Adegbohun |
| 2022/0302542 A1 | 9/2022 | Yokoyama et al. |
| 2022/0416343 A1 | 12/2022 | He et al. |
| 2023/0006266 A1 | 1/2023 | Chidester et al. |
| 2023/0021121 A1 | 1/2023 | Taniguchi et al. |
| 2024/0079671 A1 | 3/2024 | Gow et al. |
| 2024/0079686 A1 | 3/2024 | Gow et al. |

FOREIGN PATENT DOCUMENTS

| | | |
|---|---|---|
| KR | 20200072403 A | 6/2020 |
| KR | 20210129773 A | 10/2021 |
| WO | 2024054861 A1 | 3/2024 |

OTHER PUBLICATIONS

U.S. Appl. No. 18/467,088, Notice of Allowance mailed Feb. 22, 2024, 8 pgs.
International Application Serial No. PCT/US2023/073569, Search Report and Written Opinion mailed Feb. 19, 2024.
U.S. Appl. No. 18/591,346, Restriction Requirement mailed Sep. 12, 2024, 7 pgs.

* cited by examiner

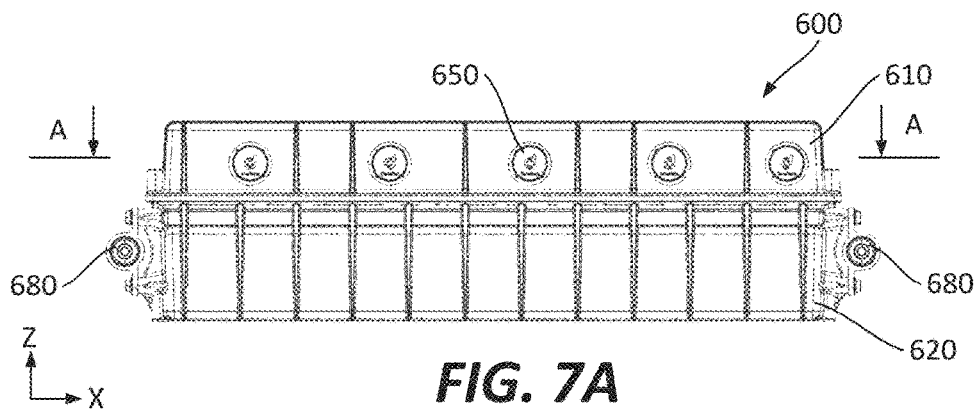
FIG. 7A
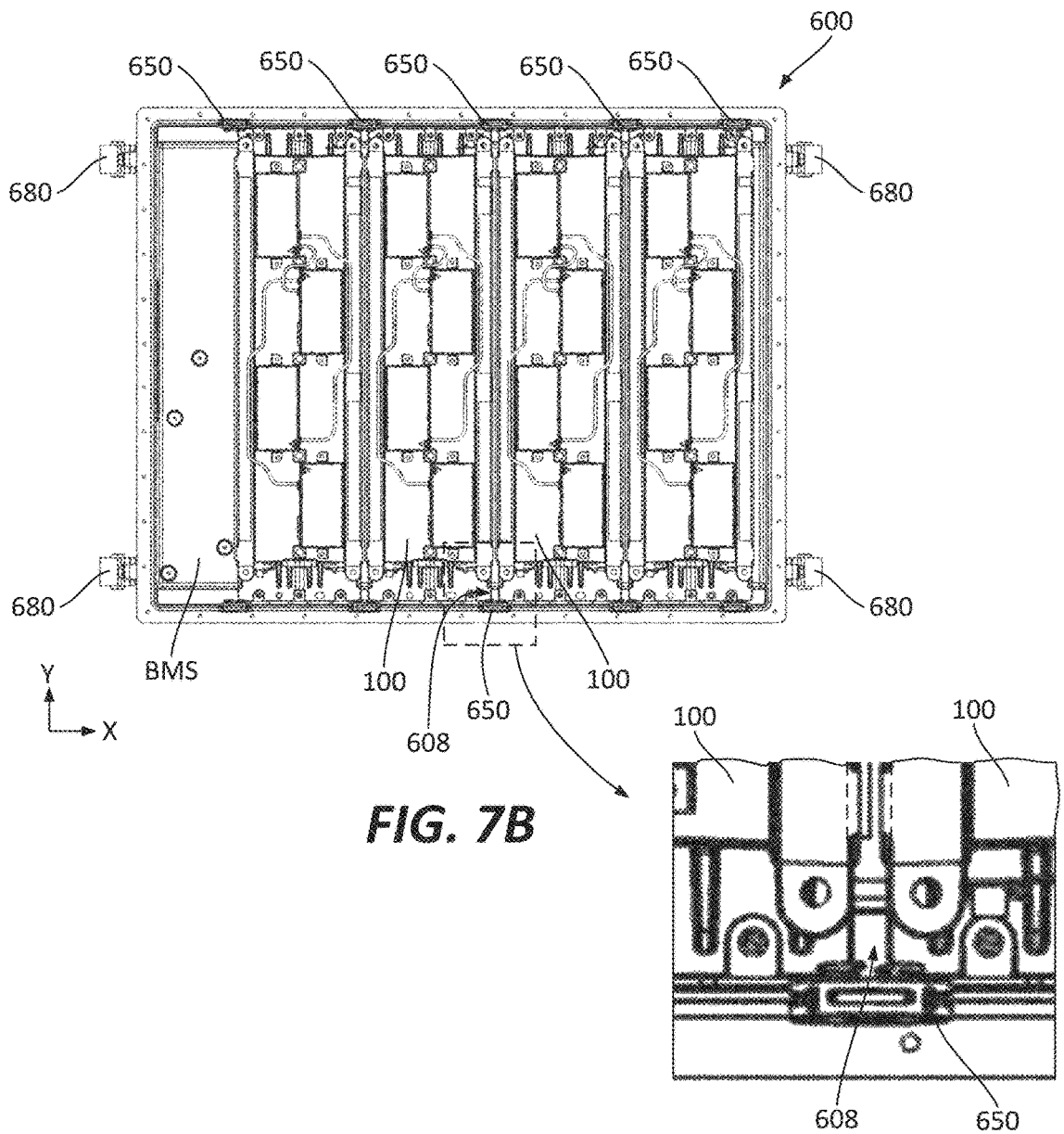
FIG. 7B
FIG. 7C

BATTERY PACKS WITH SAFETY FEATURES AND METHODS OF INSTALLING SUCH PACKS ON TRUCK FRAMES

CROSS-REFERENCE TO RELATED APPLICATIONS

This application is a continuation of U.S. application Ser. No. 18/467,088, filed on Sep. 14, 2023 which is a continuation of PCT Application No. PCT/US23/73569, filed on Sep. 6, 2023, which claims the benefit under 35 U.S.C. § 119(e) of U.S. Provisional Patent Application 63/374,708, entitled: "BATTERY MODULES AND METHODS OF FABRICATING THEREOF", filed on Sep. 6, 2023 and U.S. Provisional Patent Application 63/374,712, entitled: "BATTERY PACKS AND ELECTRIC VEHICLES COMPRISING THEREOF", filed on Sep. 6, 2022, both of which are incorporated herein by reference in its entirety for all purposes.

BACKGROUND

Electric vehicles use batteries (e.g., in the form of battery packs) to store electrical energy and to deliver this energy to various systems of the vehicle (e.g., the drivetrain for propelling the vehicles, heating-cooling systems, lights, etc.). However, integrating battery packs into electric vehicles, such as electric trucks, can be difficult because of the large space needed for these packs and the large packs' weight. For example, a 100-kWh battery pack can weigh more than 500 kg and can have a volume of more than 300 L (depending on the cell types, cooling systems, etc.). Furthermore, electric trucks have large frames that support front and rear suspension components, cabin, truck bed/cargo area, and other components/These frames limit the space available for battery packs. For example, in a frame-less car (e.g., a small passenger vehicle), the battery pack can form the vehicle's floor and can be used as a structural component (e.g., a part of the unibody design). However, such options may not be fully available in larger trucks (e.g., Class 3 trucks with a gross vehicle weight rating (GVWR) of 4,540-6,350 kg, Class 4 trucks with a GVWR of 6,350-7,260 kg, Class 5 trucks with a GVWR of 7,260-8,850 kg, and Class 6 trucks with GVWR of 8,850-11,790 kg).

Overall, integrating battery packs into vehicles with frames (e.g., electric trucks) poses several challenges due to the unique characteristics and requirements of battery packs as well as the various operational and design requirements of these vehicles. One specific challenge is associated with weight distribution/the position of the vehicle's center of mass. As noted above, battery packs can be quite heavy, and their placement within electric trucks can significantly impact the weight distribution and, as a result, the vehicle's handling. Positioning battery packs above the frame raises the vehicle's center of mass, while positioning these battery packs below the frame can negatively impact the truck's road clearance and can expose the battery packs to potential damage. At the same time, integrating battery packs into a truck's frame may require modifications to the frame. Another challenge associated with using battery packs in electric vehicles is heat management. Specifically, battery packs can generate heat during their charging and discharging, while excessive temperatures can degrade battery cells and even pose safety risks. It should be noted that asphalt and concrete can often reach surface temperatures as high as 80° C. (in direct sunlight), which can act as another heat source for battery packs. At the same time, providing cooling to the battery packs fitted around the frame can be challenging. Furthermore, trucks can be subjected to greater vibrations than passenger vehicles (due to their suspension configuration to overcome higher weight variations between loaded and unloaded trucks). Trucks' frames are exposed to various elements (e.g., water, dirt, and road debris). Yet, battery packs are expected to last for many years in electric trucks while these trucks can be operated in harsh conditions. Finally, battery packs may require maintenance or replacement over time. As such, the integration (into electric trucks, e.g., around the trucks' frames) should be in a way that allows for relatively easy access to the battery packs for servicing while ensuring safety during these operations.

What is needed are new battery modules and battery packs comprising modules that can be easily integrated into electrical vehicles, such as electric trucks, and methods of fabricating such battery modules.

SUMMARY

Described herein are battery modules and methods of fabricating thereof. In some examples, a battery module comprises an enclosure, separated into two enclosure portions and a thermal portion, positioned between the two enclosure portions. Two enclosure portions are in part defined by side walls, which can be tapered. The thermal portion comprises two thermal walls, which are operable as the bottoms of the two enclosure portions and form a thermal cavity between these thermal walls. In some examples, the enclosure is a monolithically cast component. Alternatively, the enclosure can be partially cast with one thermal wall welded thereafter to a cast subassembly. The battery module also comprises two sets of batteries, each positioned into a corresponding enclosure portion. Each battery set is interconnected with an interconnecting assembly, positioned between the battery set and the corresponding cover, for this enclosure portion.

Also described herein are battery packs and electric vehicles using these packs. In some examples, a battery pack comprises two portions/covers and a set of battery modules positioned within the enclosed cavity formed by these portions. A battery pack may comprise a set of pressure-relief valves positioned in and protruding through a wall of at least one portion. Each valve can be coaxial with a corresponding gap provided between two adjacent modules. The valve is configured to provide a fluid path (to the exterior of the battery pack) when the pressure inside the pack exceeds a set threshold. In some examples, the battery pack comprises an inlet tube fluidically coupled to the inlet port of each module and an outlet tube fluidically coupled to the outlet port of each module. A set of specially configured orifices or controllable valves is positioned on the fluid path through each module.

Clause 1. A battery module comprising: an enclosure comprising a first set of side walls, and a second set of side walls, a first thermal wall, and a second thermal wall, wherein: the first set of side walls and the first thermal wall define a first enclosure portion, the second set of side walls and the second thermal wall define a second enclosure portion, the thermal portion is positioned between the first enclosure portion and the second enclosure portion and is defined, at least in part, by the first thermal wall and the second thermal wall collectively forming a thermal cavity therebetween, and at least the first set of side walls, the second set of side walls, and the second thermal wall are monolithically cast as a single-cast component; a first set of batteries, positioned within the first enclosure portion, surrounded by the first set of side walls, and thermally coupled to the first thermal wall; a second set of batteries, positioned within the second enclosure portion, surrounded by the second set of side walls and thermally coupled to the second thermal wall; a first interconnecting assembly, surrounded and supported by the first set of side walls and interconnecting the first set of batteries; and a second interconnecting assembly, surrounded and supported by the second set of side walls and interconnecting the second set of batteries.

Clause 2. The battery module of clause 1, wherein the first thermal wall is not a part of the single-cast component and is attached to the first set of side walls after the single-cast component is fabricated.

Clause 3. The battery module of clause 2, wherein the first thermal wall is friction-stir welded to the first set of side walls after the single-cast component is fabricated.

Clause 4. The battery module of clause 1, wherein the first set of side walls, the second set of side walls, the first thermal wall, and the second thermal wall are monolithically cast such that the first thermal wall is a part of the single-cast component.

Clause 5. The battery module of clause 1, wherein the first set of side walls comprises an interior surface facing the first enclosure portion and forming an interior-surface angle ($\beta$) between the interior surface of the first set of side walls and the first thermal wall of greater than 90°.

Clause 6. The battery module of clause 5, wherein interior-surface angle ($\beta$) between the interior surface of the first set of side walls and the first thermal wall is between 91°-97°.

Clause 7. The battery module of clause 1, wherein the first set of side walls has a height greater than the height of the first set of batteries.

Clause 8. The battery module of clause 1, wherein: the first set of side walls comprises a top edge and an intermediate edge, each extending parallel to the first thermal wall, and the intermediate edge is positioned between the top edge and the first thermal wall and supports the first interconnecting assembly.

Clause 9. The battery module of clause 8, further comprising a first cover and a second cover, wherein: the first cover is supported on the top edge of the first set of side walls such that at least a portion of the first interconnecting assembly is positioned between the first cover and the first interconnecting assembly, and the second cover is supported on the second set of side walls such that at least a portion of the second interconnecting assembly is positioned between the second cover and the second interconnecting assembly.

Clause 10. The battery module of clause 1, wherein at least a portion of the first interconnecting assembly extends outside of the first enclosure portion and is attached to an exterior surface of the first set of side walls using a pressure-sensitive adhesive.

Clause 11. The battery module of clause 1, wherein each of the first set of side walls and the second set of side walls comprises side wall openings for protruding bus bars to each of the first interconnecting assembly and the second interconnecting assembly.

Clause 12. The battery module of clause 1, wherein: the first set of side walls comprises a top edge, and the side wall openings of the first set of side walls extend to the top edge.

Clause 13. The battery module of clause 1, wherein: the first thermal wall comprises a base and an electrically insulating surface layer, positioned between the base and the first set of batteries and directly interfacing the first set of batteries, and the electrically insulating surface layer electrically insulates the base of the first thermal wall from the first set of batteries.

Clause 14. The battery module of clause 13, wherein the electrically insulating surface layer is thermally conductive epoxy, attaching the first set of batteries to the first thermal wall.

Clause 15. The battery module of clause 1, wherein: the first set of side walls comprises a top edge, the thermal portion further comprises a first fluid port and a second fluid port providing fluidic communication to the thermal cavity, and the second fluid port is positioned closer to the top edge of the first set of side walls than the first fluid port.

Clause 16. The battery module of clause 15, wherein: the thermal portion comprises a divider extending through the thermal cavity between and monolithic with each of the first thermal wall and the second thermal wall and at least partially separating the thermal cavity into a first cavity portion and a second cavity portion, the first fluid port extends into the first cavity portion, and the second fluid port extends into the first cavity portion.

Clause 17. The battery module of clause 16, wherein: the enclosure comprises a first enclosure side and a second enclosure side, the first fluid port and the second fluid port are positioned at the first enclosure side, and the divider extends to the first enclosure side and is separated by a gap from the second enclosure side.

Clause 18. The battery module of clause 1, wherein: the thermal portion comprises a set of pins extending through the thermal cavity between and monolithic with each of the first thermal wall and the second thermal wall, the set of pins is configured to enhance the thermal transfer between a thermal fluid, disposed within the thermal cavity, and each of the first thermal wall and the second thermal wall.

Clause 19. The battery module of clause 1, further comprising a first enclosure divider and a fire-retardant foam, wherein: the first set of side walls comprises a top edge, the first enclosure divider is positioned between the top edge and the first thermal wall such that the first set of battery cells protrude through the first enclosure divider, and the fire-retardant foam fills space around the first set of battery cells and between the first enclosure divider and the first cover.

Clause 20. A method of fabricating a battery module, the method comprising: die casting an enclosure subassembly comprising a first set of side walls, a second set of side walls, and a second thermal wall; friction-stir welding a first thermal wall to the first set of side walls of the enclosure subassembly thereby forming the enclosure, wherein: the first set of side walls and the first thermal wall define a first enclosure portion, the second set of side walls and the second thermal wall define a second enclosure portion, the thermal portion is positioned between the first enclosure portion and the second enclosure portion and is defined, at least in part, by the first thermal wall and the second thermal wall collectively forming a thermal cavity therebetween, and positioning a first set of batteries into the first enclosure portion enclosure such that the first set of batteries is surrounded by the first set of side walls and thermally coupled to the first thermal wall; positioning a second set of batteries into the second enclosure portion enclosure such that the second set of batteries is surrounded by the second set of side walls and thermally coupled to the second thermal wall; interconnecting the first set of batteries using a first interconnecting assembly such that, after interconnecting the first set of batteries, the first interconnecting assembly is surrounded and supported by the first set of side walls; and interconnecting the second set of batteries using a second interconnecting assembly such that, after interconnecting the second set of batteries, the second interconnecting assembly is surrounded and supported by the second set of side walls.

Clause 21. A battery pack comprising: a first portion; a second portion, attached to the first portion and forming an enclosed cavity with the first portion; a set of battery modules positioned within the enclosed cavity and separated by a set of module gaps, wherein any two adjacent modules in the set of battery modules are separated by one gap in the set of module gaps; and a set of pressure-relief valves positioned in and protruding through a wall of the first portion, wherein: each valve in the set of pressure-relief valves is configured to provide a fluid path from the enclosed cavity to the environment outside of the battery pack when the pressure inside the enclosed cavity at or exceeds a set threshold, the enclosed cavity is fluidically isolated from the environment when the pressure inside the enclosed cavity is below the set threshold, and each valve in the set of pressure-relief valves is coaxial with one gap in the set of module gaps.

Clause 22. The battery pack of clause 21, wherein each battery module in the set of battery modules comprises: an enclosure comprising a first set of side walls, and a second set of side walls, a first thermal wall, and a second thermal wall, wherein: the first set of side walls and the first thermal wall define a first enclosure portion, the second set of side walls and the second thermal wall define a second enclosure portion, the thermal portion is positioned between the first enclosure portion and the second enclosure portion and is defined, at least in part, by the first thermal wall and the second thermal wall collectively forming a thermal cavity therebetween, and at least the first set of side walls, the second set of side walls, and the second thermal wall are monolithically cast as a single-cast component; a first set of batteries, positioned within the first enclosure portion, surrounded by the first set of side walls, and thermally coupled to the first thermal wall; a second set of batteries, positioned within the second enclosure portion, surrounded by the second set of side walls and thermally coupled to the second thermal wall; a first interconnecting assembly, surrounded and supported by the first set of side walls and interconnecting the first set of batteries; and a second interconnecting assembly, surrounded and supported by the second set of side walls and interconnecting the second set of batteries.

Clause 23. The battery pack of clause 21, wherein each battery module in the set of battery modules is positioned between two gaps in the set of module gaps.

Clause 24. The battery pack of clause 23, wherein each battery module in the set of battery modules comprises two module covers, each facing one of the two gaps in the set of module gaps.

Clause 25. The battery pack of clause 23, wherein: the set of pressure-relief valves comprises a first subset of pressure-relief valves and a second subset of pressure-relief valves, the wall of the first portion comprises a first sidewall and a second sidewall, opposite the first sidewall, the first subset of pressure-relief valves is positioned in and protruding through the first sidewall, and the second subset of pressure-relief valves is positioned in and protruding through the second sidewall.

Clause 26. The battery pack of clause 25, wherein each of the first subset of pressure-relief valves and the second subset of pressure-relief valves consists of five pressure-relief valves.

Clause 27. The battery pack of clause 26, wherein the set of battery modules consists of 4 modules.

Clause 28. A battery pack comprising: a first portion; a second portion, attached to the first portion and forming an enclosed cavity with the first portion; a set of battery modules positioned within the enclosed cavity and each comprising an inlet port and an outlet port; a pack inlet tube fluidically coupled to the inlet port of each module in the set of battery modules; a pack outlet tube fluidically coupled to the outlet port of each module in the set of battery modules; and a set of flow control devices selected from the group consisting of constant-flow restrictors and controllable valves, each of the flow control devices provides a selective fluid pathway between the pack inlet tube and the inlet port or between the pack outlet tube and the outlet port.

Clause 29. The battery pack of clause 21, wherein each battery module in the set of battery modules comprises: an enclosure comprising a first set of side walls, and a second set of side walls, a first thermal wall, and a second thermal wall, wherein: the first set of side walls and the first thermal wall define a first enclosure portion, the second set of side walls and the second thermal wall define a second enclosure portion, the thermal portion is positioned between the first enclosure portion and the second enclosure portion and is defined, at least in part, by the first thermal wall and the second thermal wall collectively forming a thermal cavity therebetween, and at least the first set of side walls, the second set of side walls, and the second thermal wall are monolithically cast as a single-cast component; a first set of batteries, positioned within the first enclosure portion, surrounded by the first set of side walls, and thermally coupled to the first thermal wall; a second set of batteries, positioned within the second enclosure portion, surrounded by the second set of side walls and thermally coupled to the second thermal wall; a first interconnecting assembly, surrounded and supported by the first set of side walls and interconnecting the first set of batteries; and a second interconnecting assembly, surrounded and supported by the second set of side walls and interconnecting the second set of batteries.

Clause 30. The battery pack of clause 28, further comprising a set of module temperature probes configured to measure temperature at one or more locations in each module in the set of battery modules, wherein the set of controllable valves is controlled based on the output of the set of module thermocouples.

Clause 31. The battery pack of clause 30, further comprising a set of fluid thermocouples configured to measure the temperature of a thermal fluid entering each module in the set of battery modules and, separately, exiting each module in the set of battery modules, wherein the set of controllable valves is controlled based on the output of the set of fluid thermocouples.

Clause 32. The battery pack of clause 31, further comprising a controller configured to: receive the temperature of the thermal fluid entering each module in the set of battery modules, the temperature of the thermal fluid exiting each module in the set of battery modules, the position of each valve in the set of controllable valves, and calculate the total heat transferred from each module in the set of battery modules.

Clause 33. The battery pack of clause 32, wherein the controller is configured to control the position of each valve in the set of controllable valves based on the total heat transferred from each module in the set of battery modules.

Clause 34. An electric vehicle comprising: a vehicle frame comprising two side rails and a set of cross-members, each extending perpendicular to and interconnecting the two side rails; and a set of battery packs, enclosed within and attached to the vehicle frame, wherein: each pack in the set of battery packs comprises a first portion, a second portion, attached to the first portion and forming an enclosed cavity with the first portion, and a set of battery modules positioned within the enclosed cavity, and the second portion comprises a set of support assemblies, each positioned adjacent to one corner of the second portion and attached to one cross-member in the set of cross-members.

Clause 35. The battery pack of clause 21, wherein each battery module in the set of battery modules comprises: an enclosure comprising a first set of side walls, and a second set of side walls, a first thermal wall, and a second thermal wall, wherein: the first set of side walls and the first thermal wall define a first enclosure portion, the second set of side walls and the second thermal wall define a second enclosure portion, the thermal portion is positioned between the first enclosure portion and the second enclosure portion and is defined, at least in part, by the first thermal wall and the second thermal wall collectively forming a thermal cavity therebetween, and at least the first set of side walls, the second set of side walls, and the second thermal wall are monolithically cast as a single-cast component; a first set of batteries, positioned within the first enclosure portion, surrounded by the first set of side walls, and thermally coupled to the first thermal wall; a second set of batteries, positioned within the second enclosure portion, surrounded by the second set of side walls and thermally coupled to the second thermal wall; a first interconnecting assembly, surrounded and supported by the first set of side walls and interconnecting the first set of batteries; and a second interconnecting assembly, surrounded and supported by the second set of side walls and interconnecting the second set of batteries.

Clause 36. The electric vehicle of clause 34, wherein each support assembly in the set of support assemblies comprises: a support bracket fixedly attached to the one cross-member in the set of cross-members, and a support bushing fixedly attached to a wall of the second portion and pivotably attached to the support bracket.

Clause 37. The electric vehicle of clause 36, wherein the support bushing comprises: a rigid bushing enclosure bolted to the wall of the second portion, and an elastomeric bushing supported and surrounded by the rigid bushing enclosure.

Clause 38. The electric vehicle of clause 37, wherein the support bushing is pivotably attached to the support bracket by a support bolt that protrudes through the elastomeric bushing.

Clause 39. The electric vehicle of clause 38, wherein the support bolt extends in a direction perpendicular to each of the two side rails and the set of cross-members.

Clause 40. The electric vehicle of clause 39, wherein the support bolt extends in a direction parallel to the set of cross-members.

These and other embodiments are described further below with reference to the figures.

BRIEF DESCRIPTION OF THE DRAWINGS

FIG. 7A is a schematic side view of the battery pack in FIG. 6A, in accordance with some examples.

FIG. 7B is a schematic top view of the battery pack in FIG. 6A with the first portion removed to illustrate battery modules positioned within the enclosed cavity formed by the two portions, in accordance with some examples.

FIG. 7C is an expanded view of a part of the battery pack in FIG. 7B, which illustrates a gap between two adjacent modules and the orientation of a pressure-relief valve relative to this gap, in accordance with some examples.

DETAILED DESCRIPTION

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

Battery Module Examples

Figure 1A:
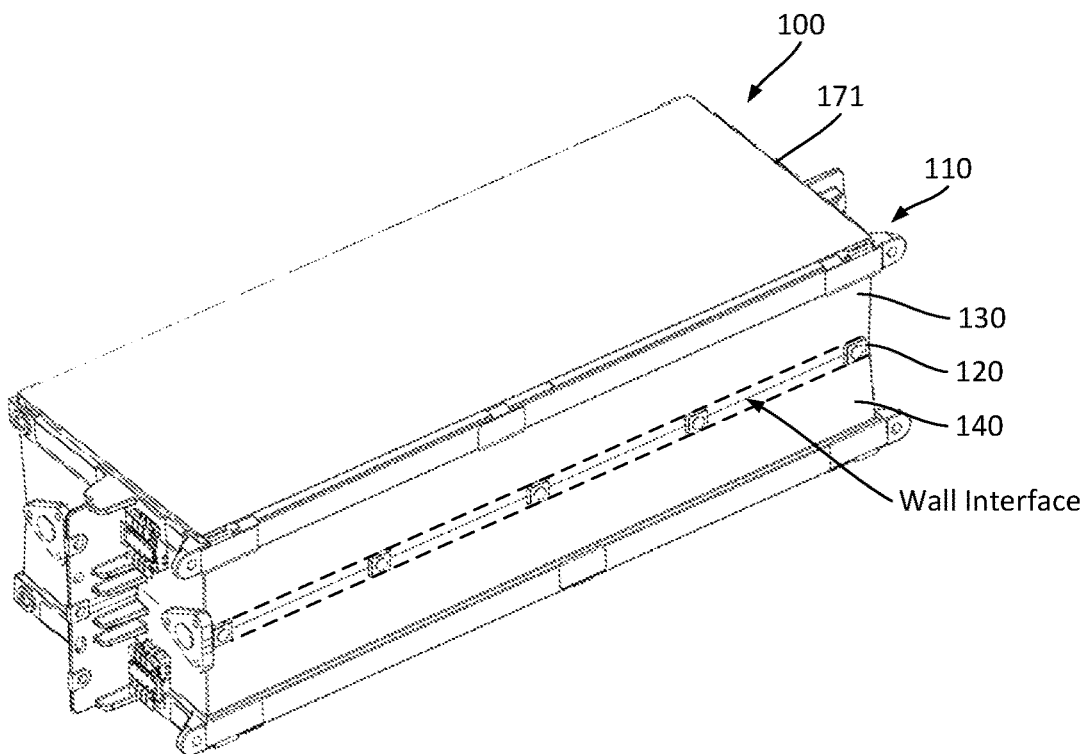
FIG. 1A is a schematic perspective view of a battery module, in accordance with some examples.
Figure 1B:
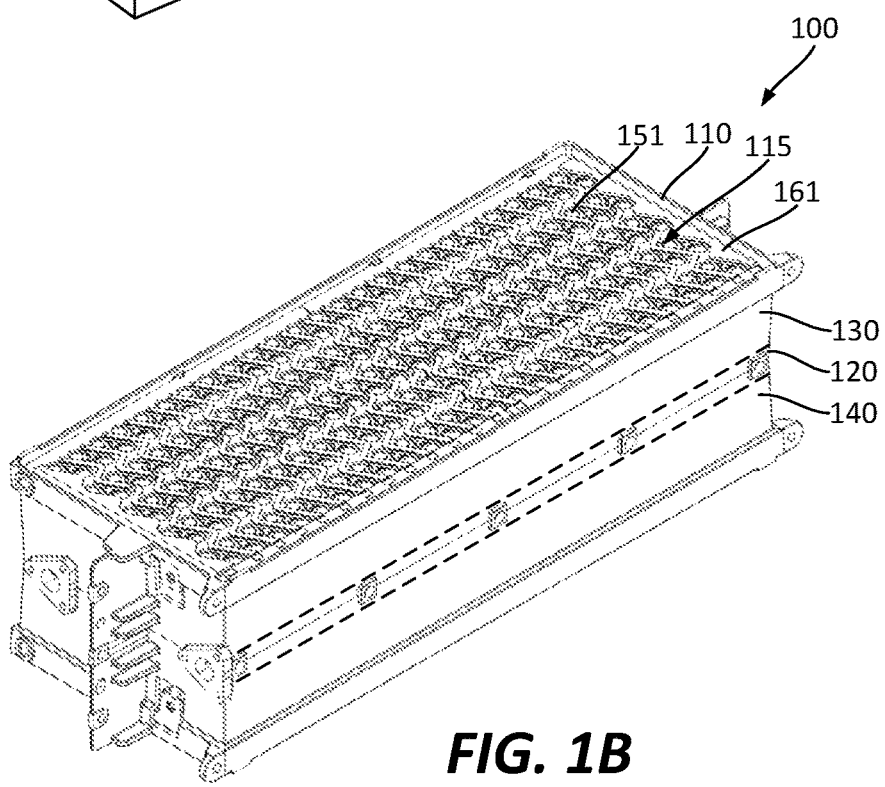
FIG. 1B is a schematic perspective view of the battery module in FIG. 1A with a cover removed showing one interconnecting assembly positioned over the one set of battery cells, in accordance with some examples.
Figure 1C:
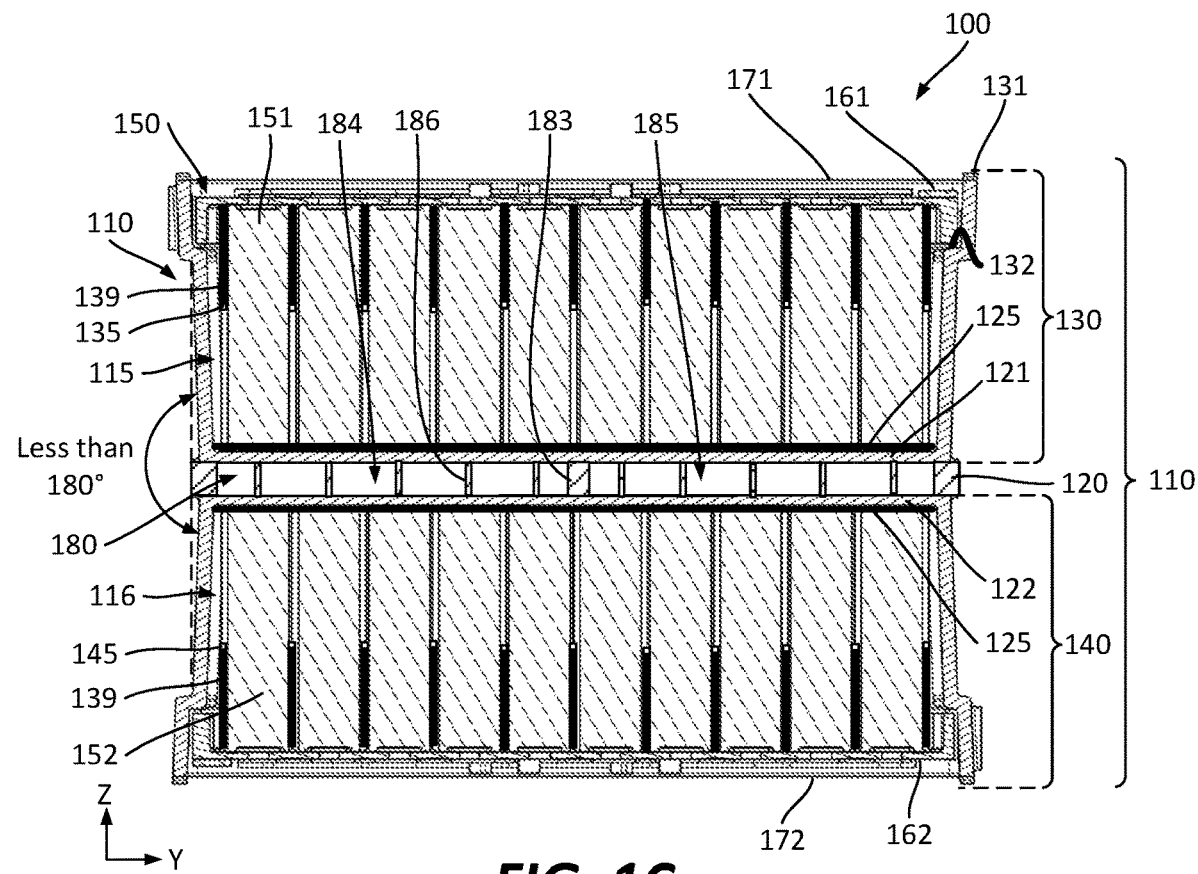
FIG. 1C is a schematic cross-sectional view of the battery module in FIG. 1A illustrating two sets of battery cells positioned on different sides of the thermal portion, in accordance with some examples.
Figure 1D:
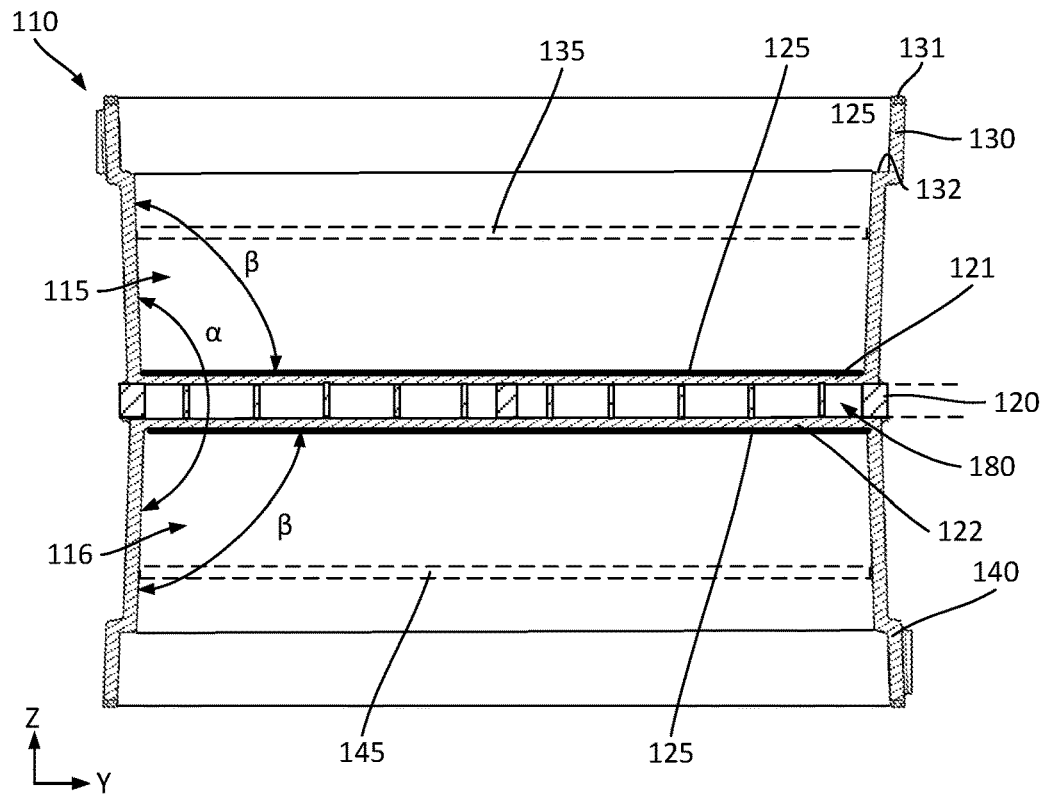
FIG. 1D is a cross-sectional view of a battery module enclosure without any battery cells, in accordance with some examples.
Figure 2A:
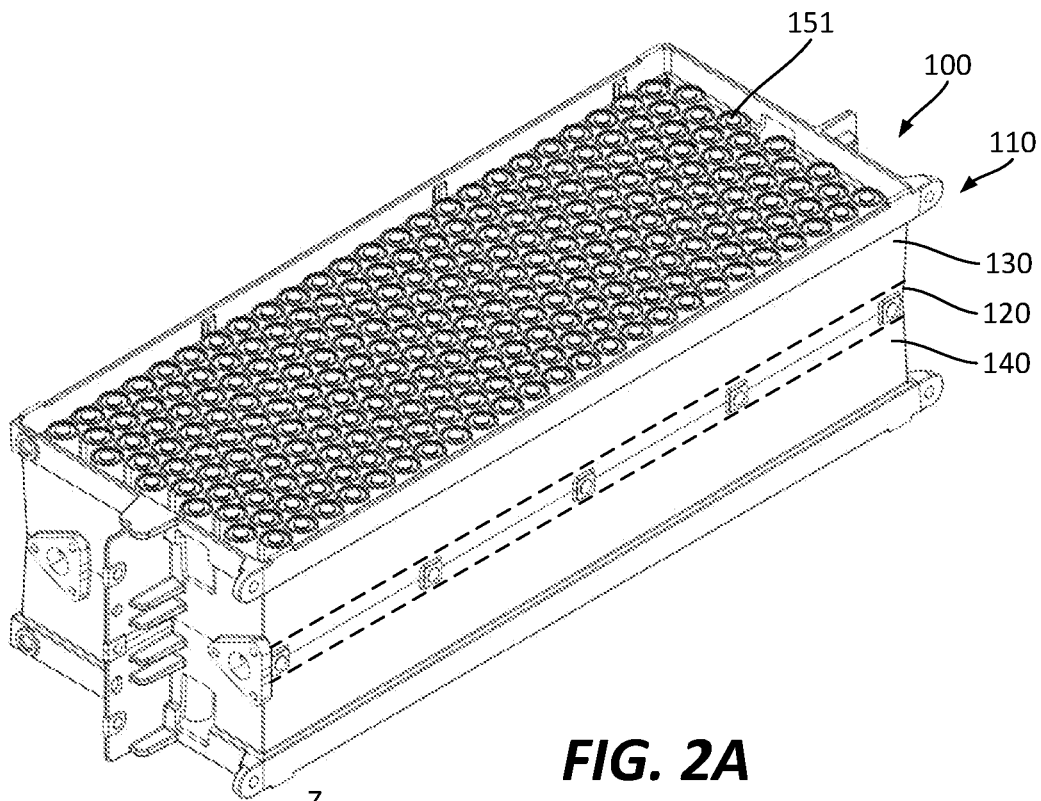
FIG. 2A is a schematic perspective view of the battery module in FIG. 1A with the interconnecting assembly removed, illustrating one set of battery cells positioned in one enclosure portion, in accordance with some examples.

FIG. 1A is a schematic perspective view of battery module 100, in accordance with some examples. Specifically, battery module 100 comprises enclosure 110 formed by a first set of side walls 130 and a second set of side walls 140 as well as first cover 171 and second cover 172. The entire enclosure 110 can be formed from aluminum. Referring to FIGS. 1B, 1C, and 1D, enclosure 110 comprises a first enclosure portion 115 and a second enclosure portion 116, separated by a thermal portion 120. Specifically, the first enclosure portion 115 is defined by the first set of side walls 130. The first enclosure portion 115 is used to enclose a first set of battery cells 151 (e.g., shown in FIG. 2A) and can be sealed with the first cover 171. The second enclosure portion 116 is defined by the second set of side walls 140. The second enclosure portion 116 is used to enclose a second set of battery cells 152 and can be sealed with the first cover 172. The first set of battery cells 151 and the second set of battery cells 152 are collectively referred to as battery cells 150. As shown in FIGS. 1A-1D, first set of battery cells 151 and/or second set of battery cells 152 can include cylindrical battery cells (e.g., 18650 cells, 21700 cells, 30700 cells, 4680 cells). However, other types of battery cells are within the scope.

Referring to FIGS. 1B, 1C, and 1D, thermal portion 120 is positioned between first enclosure portion 115 and second enclosure portion 116 and comprises first thermal wall 121 and second thermal wall 122 as well as thermal cavity 180. Specifically, the first thermal wall 121 separates the thermal cavity 180 from the first enclosure portion 115, while the second thermal wall 122 separates the thermal cavity 180 from the second enclosure portion 116. The first thermal wall 121 provides a thermal pathway from the first set of battery cells 151 to the cooling liquid within the thermal cavity 180. Similarly, the second thermal wall 122 provides a thermal pathway from the second set of battery cells 152 to the cooling liquid within the thermal cavity 180. Overall, the first set of battery cells 151 is positioned within the first enclosure portion 115, surrounded by the first set of side walls 130, and thermally coupled to the first thermal wall 121. The second set of battery cells 152 is positioned within the second enclosure portion 116, surrounded by the second set of side walls 140, and thermally coupled to the second thermal wall 122.

The X-Y boundary of thermal portion 120 is defined by the first set of side walls 130 and the second set of side walls 140 (along the Z-axis). In other words, the first set of side walls 130 and the second set of side walls 140 are parts of the first enclosure portion 115, the second enclosure portion 116, and the thermal cavity 180. The first set of side walls 130 and the second set of side walls 140 are joined at thermal cavity 180 (shown as a "wall interface" in FIG. 1A). Overall, thermal cavity 180 is formed by the first thermal wall 121, the second thermal wall 122, the first set of side walls 130, and the second set of side walls 140.

In some examples, the entire enclosure 110 is a monolithically cast component. In other words, there are no joining seams (e.g., weld seams) and joining structures (e.g., brackets) between different components of enclosure 110, such as between the first thermal wall 121, the second thermal wall 122, the first set of side walls 130, and the second set of side walls 140. In other words, the first thermal wall 121, the second thermal wall 122, the first set of side walls 130, and the second set of side walls 140 are all formed in the same casting operation forming one monolithically cast component comprising these elements. The thermal cavity 180 is also formed/defined during this operation. Forming the enclosure 110 as a single monolithically cast component helps to simplify the fabrication process (e.g., by reducing the number of operations), reduce the total weight of the enclosure 110, and improve the structural integrity of the enclosure 110.

Alternatively, at least the first thermal wall 121 can be friction-stir welded to the first set of side walls 130 as further described below with reference to FIG. 2D. The second thermal wall 122, the first set of side walls 130, and the second set of side walls 140 can still all be formed in the same metal casting operation thereby forming one monolithically cast component comprising these elements. At this point, the thermal cavity 180 is not yet formed/defined since the first thermal wall 121 is not present. The first thermal wall 121 can be formed in a separate casting operation and later friction-stir welded to the first set of side walls 130. This example casting-welding sequence allows simplifying the metal casting process of various features inside the battery cells 150.

Referring to FIG. 1C, in some examples, the exterior surfaces of the first set of side walls 130 and the second set of side walls 140 form an angle that is less than 180° or, more specifically, less than 176° or even less than 174° around the perimeter of enclosure 110. The corner defined by this angle is the interface between the first set of side walls 130 and the second set of side walls 140, which can coincide with a middle plane through the thermal portion 120/the thermal cavity 180. As such, the exterior surfaces of the first set of side walls 130 and the second set of side walls 140 do not extend along a straight line (shown with a dotted line in FIG. 1C).

This exterior-surface angle also corresponds to an interior-surface angle ($\alpha$) as shown in FIG. 1D. For example, the interior surfaces of the first set of side walls 130 and the second set of side walls 140 form an interior-surface angle ($\alpha$) that is greater than 180° or, more specifically, greater than 182° or even greater than 184° around the perimeter of enclosure 110. It should be noted that this interior-surface angle ($\alpha$) also corresponds to an angle ($\beta$) between the interior surface of the first set of side walls 130 and the first thermal wall 121 (or between the interior surface of the second set of side walls 140 and the second thermal wall 122), which can be greater than 90° or, more specifically, greater than 92° or even greater than 94°. For example, these interior-surfaces-to-thermal-walls angles ($\beta$) can be 91°-97° or, more specifically, 93°-95°.

These angles correspond to the first set of side walls 130 forming a tapered-shaped first enclosure portion 115 over the first thermal wall 121. Similarly, the second set of side walls 140 forms a tapered-shaped second enclosure portion 116 over the second thermal wall 122. As such, the opening of the first enclosure portion 115 can be larger than the portion of the first thermal wall 121 (at the bottom of the first enclosure portion 115) thereby enabling additional access to the first set of battery cells 151 (proximate to this opening) to install/interconnect the battery cells. Similarly, the opening of the second enclosure portion 116 can be larger than the portion of the second thermal wall 122 (at the bottom of the second enclosure portion 116) thereby enabling additional access to the second set of battery cells 152 (proximate to this opening) to install/interconnect the battery cells. This access can also be used, e.g., for mounting a first interconnecting assembly 161 and a second interconnecting assembly 162.

Referring to FIG. 1C, in some examples, the first set of side walls 130 has a height (in the Z-direction) greater than the height of the first set of battery cells 151. This approach allows the use of the first set of side walls 130 for mounting additional components without interfering with the first set of battery cells 151. With reference to FIGS. 1C and 1D, in some examples, the first set of side walls 130 comprises a top edge 131 and an intermediate edge 132, each extending parallel to the first thermal wall 121. The intermediate edge 132 is positioned between the top edge 131 and the first thermal wall 121 and can be used to support the first interconnecting assembly 161. As shown in FIG. 1C, the intermediate edge 132 can be positioned closer to the first thermal wall 121 than the plane defined by battery cell contacts. The first interconnecting assembly 161 may comprise protrusion extending from the battery-cell-contact plane and engaging the intermediate edge 132 of the first set of side walls 130.

Referring to FIG. 1C, in further examples, the battery module 100 further comprises a first cover 171 and a second cover 172. The first cover 171 is supported on the top edge 131 of the first set of side walls 130 and protects the first interconnecting assembly 161. The second cover 172 is supported on the second set of side walls 140, e.g., using a similar edge, and protects the second interconnecting assembly 162.

Referring to FIGS. 1C and 1D, in some examples, battery module 100 comprises a first enclosure divider 135 and a second enclosure divider 145, which are optional components. For example, a portion of the first enclosure portion 115 between the first enclosure divider 135 and the top edge 131 (or, more specifically, the first cover 171 when the first cover 171 is installed) is filled with fire-retardant foam 139 (e.g., a silicone foam having a fire-retardant filler particle). In some examples, the distance between the first enclosure divider 135 and the top edge 131 is 10-40 millimeters or, more specifically, 15-30 millimeters. Similarly, a portion of the second enclosure portion 116 between the second enclosure divider 145 and the top edge of the second set of side walls 140 (or the second cover 172) is filled with fire-retardant foam 139. The first enclosure divider 135 and second enclosure divider 145 reduce the amount of fire-retardant foam 139 needed in each battery module 100 thereby reducing the cost and weight of the battery module 100. It should be noted that the fire-retardant foam 139 protects the most critical part of battery cells 150, e.g., the cell caps comprising cell terminals, and wire bonding connections to these cells.

As noted above, in some examples, battery module 100 comprises a first interconnecting assembly 161, surrounded and supported by the first set of side walls 130 and interconnecting the first set of battery cells 151. Specifically, the first interconnecting assembly 161 is positioned between the first set of battery cells 151 and the first cover 171. The first cover 171 protects the first interconnecting assembly 161. In more specific examples, the battery module 100 also comprises the second interconnecting assembly 162, surrounded and supported by the second set of side walls 140 and the interconnecting second set of battery cells 152.

Figure 1E:
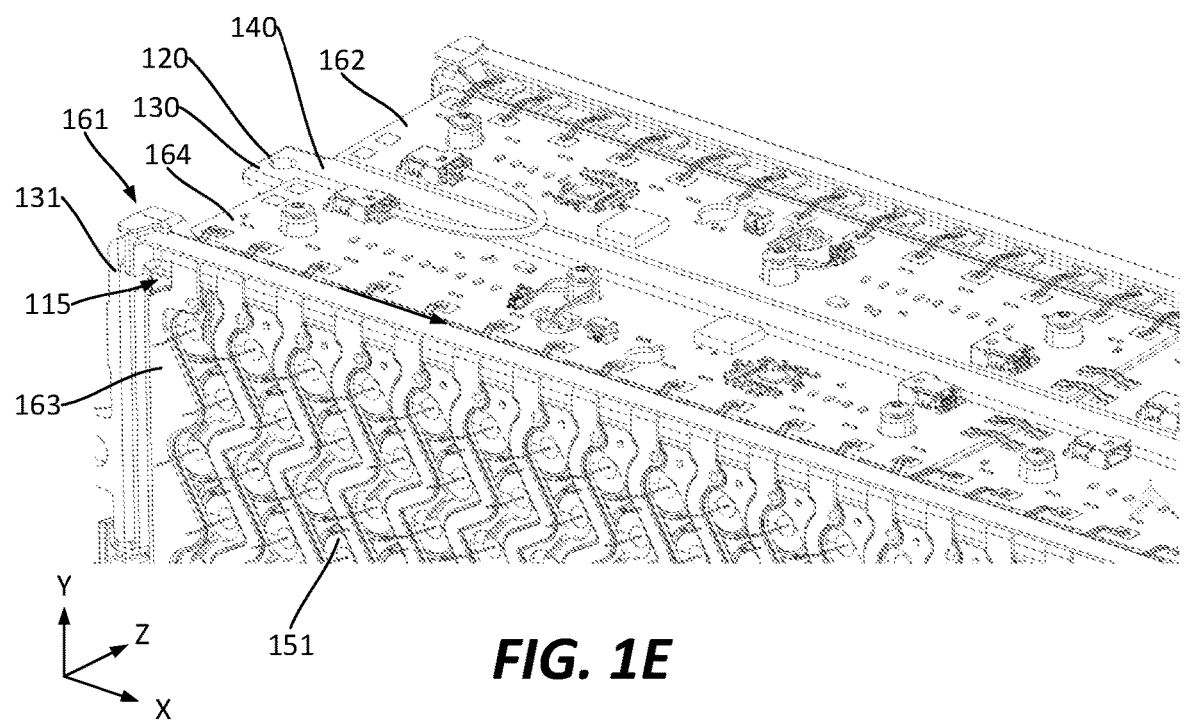
FIG. 1E is another schematic perspective view of the battery module in FIG. 1A, illustrating additional features of the two interconnecting assemblies, in accordance with some examples.
Figure 1F:
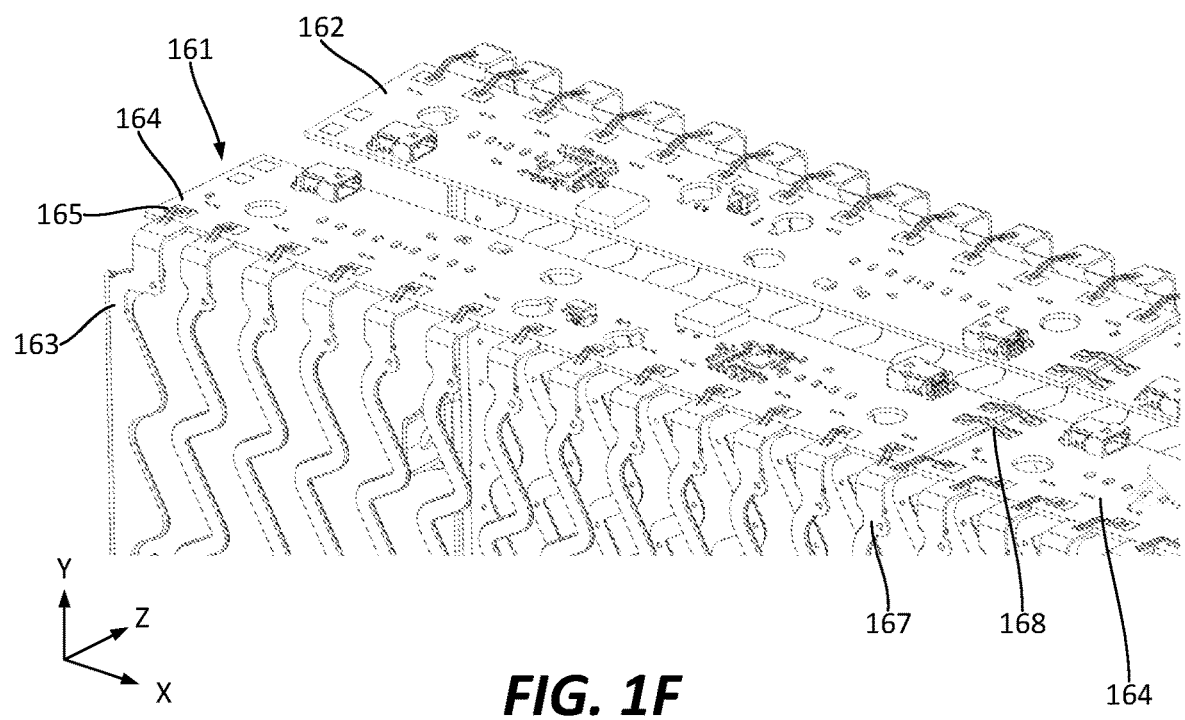
FIG. 1F is a schematic perspective view of the two interconnecting assemblies, illustrating various features of these assemblies, in accordance with some examples.

FIG. 1E is another example of interconnecting assemblies that extend outside of their respective enclosure portions. FIG. 1F is a schematic perspective view of the two interconnecting assemblies in FIG. 1E without the module enclosure and battery cells. Specifically, a portion of the first interconnecting assembly 161 is positioned within the first enclosure portion 115 together with the first set of battery cells 151. This portion of the first interconnecting assembly 161 comprises bus bars 163, which are wire-bonded to the cell terminals. Another portion of the first interconnecting assembly 161 extends outside the first enclosure portion 115 and extends over the external surface of one long side wall of the first set of side walls 130. FIG. 1E also illustrates a similar portion of the second interconnecting assembly 162 extending outside the second enclosure portion 116 and over the external surface of one long side wall of the second set of side walls 140.

This external portion of the first interconnecting assembly 161 may be in the form of a printed circuit board 164 (or multiple printed circuit boards (PCBs) as shown in FIGS. 1E and 1F) and may be connected to bus bars 163 using wire bonds 165. These printed circuit boards 164 can be bonded to the external surface of the first set of side walls 130 and the second set of side walls 140 using a pressure-sensitive adhesive (PSA). The PSA eliminates the need for the fastener. For example, the wire-bonding process can distort the printed circuit board 164 or at least shift this position, while the PSA can help to provide more uniform support (across the entire plane rather than point supports available with fasteners. It should be noted that a PCB can be quite flexible in the out-of-plane direction, and such uniform support can be essential to preserve all connections.

When multiple printed circuit boards 164 are used, these multiple printed circuit boards 164 can be interconnected through a common bus bar 167 and/or PCB links 168. Printed circuit boards 164 can be used to perform various functions of the battery management system at the module level. Additional battery management systems can be provided at the battery pack and/or vehicle levels. For example, printed circuit boards 164 are used for individual voltage measurements at each bus bar 163.

Figure 2B:
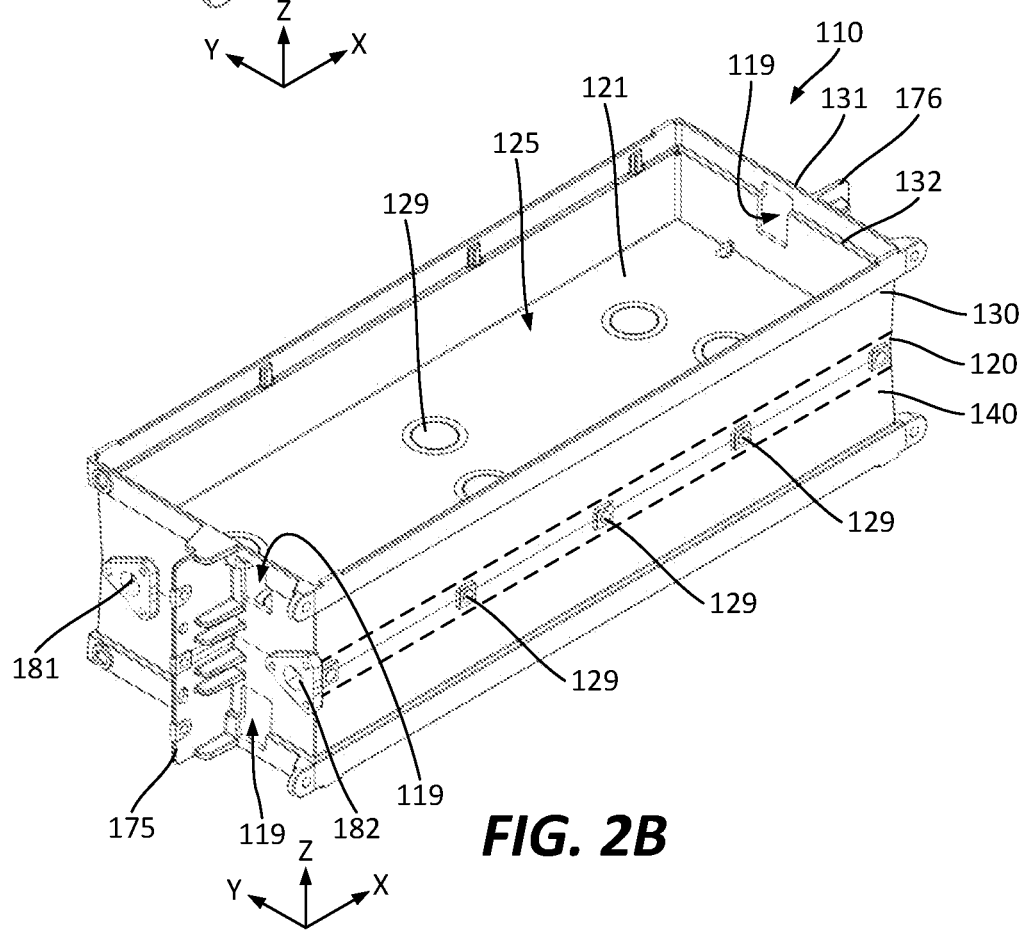
FIG. 2B is a schematic perspective view of the enclosure of the battery module in FIG. 1A, in accordance with some examples.

Referring to FIG. 2B, in some examples, each of the first set of side walls 130 and the second set of side walls 140 comprises side wall openings 119 for protruding bus bars to each of the first interconnecting assembly 161 and the second interconnecting assembly 162. A pair of side wall openings 119 can be used to provide access to the first interconnecting assembly 161 positioned in the first enclosure portion 115. These side wall openings 119 may be positioned on the opposite (smaller) sides of the first set of side walls 130. Another pair of side wall openings 119 can be used to provide access to the second interconnecting assembly 162 positioned in the second enclosure portion 116. These side wall openings 119 may be positioned on the opposite (smaller) sides of the second set of side walls 140. In some examples, side wall openings 119 are not enclosed openings (e.g., as shown in FIG. 2B) but instead are slot openings extending to the top edge 131 of the first set of side walls 130 (and a similar edge of the second set of side walls 140). The slot openings simplify the installation of bus bars for interconnecting this battery module 100 with other modules in a battery pack. In some examples, the bus bars are parts of the first interconnecting assembly 161 and/or the second interconnecting assembly 162.

Referring to FIG. 2B, in some examples, enclosure 110 further comprises a first support bracket 175 and a second support bracket 176 positioned on opposite sides of enclosure 110. The first support bracket 175 and the second support bracket 176 extend across and are monolithic with both the first set of side walls 130 and the second set of side walls 140. The first support bracket 175 and the second support bracket 176 are used to support module 100 within a battery pack, e.g., as schematically shown in FIG. 6B.

Referring to FIG. 1D, in some examples, the first thermal wall 121 comprises an electrically insulating surface layer 125, forming the bottom of the first enclosure portion 115 and directly interfacing with the first set of battery cells 151 (when these cells are positioned within the first enclosure portion 115 as shown in FIG. 1C). For example, the base of the first thermal wall 121 can be formed from aluminum, while electrically insulating surface layer 125 can be formed using polymer, plastic, or other suitable material. The thickness of the layer may be minimal to ensure electrical isolation while minimizing the heat flux resistance between the first set of battery cells 151 and the cooling liquid within the thermal cavity 180. The second thermal wall 122 may comprise a similar electrically insulating surface layer 125, forming the bottom of the second enclosure portion 116 and directly interfacing with the second set of battery cells 152. In some examples, the electrically insulating surface layer 125 is formed by thermally conductive epoxy, which also bonds and supports the battery cells 150 relative to the corresponding thermal wall.

Figure 2C:
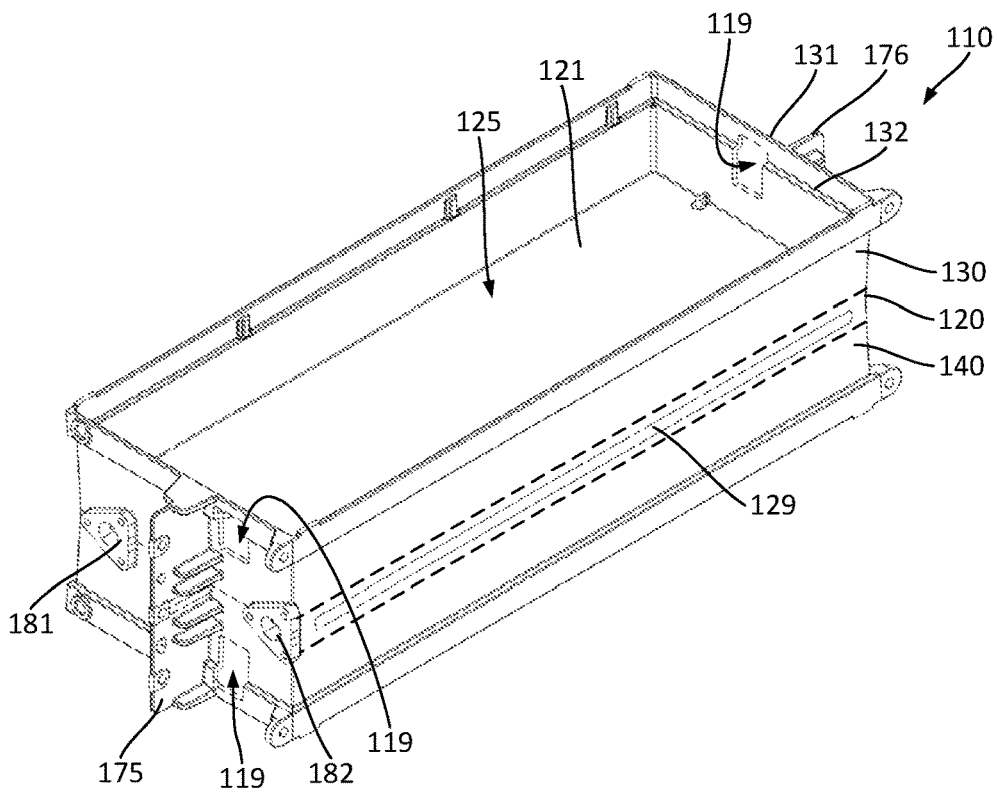
FIG. 2C is a schematic perspective view of another example of the enclosure.

Referring to FIGS. 2B-2C, in some examples, the enclosure is formed as a single-cast monolithic component such that the thermal portion 120 comprises at least two post-cast plugs 129 positioned on opposite sides of enclosure 110. These post-cast plugs 129 are used to seal openings that are left from supporting rods protruding to a dissolvable core, which are used to form the thermal cavity 180 while metal casting the enclosure 110. The post-cast plugs 129 can be parts of the side walls and/or parts of the first thermal wall 121, e.g., as shown in FIG. 2B (and parts of the second thermal wall 122, which is not visible in FIG. 2B). Referring to FIG. 2C, in some examples, post-cast plugs 129 are only parts of the side walls, but not of the first thermal wall 121 or the second thermal wall 122. The first thermal wall 121 and the second thermal wall 122 can be free from any plugs (e.g., can be a continuous monolithic structure). In these examples, wherein post-cast plugs 129 are only parts of the side walls, post-cast plugs 129 can have an elongated shape (e.g., as shown in FIG. 2C). This shape is determined by the structures used to support a dissolvable core. When present, post-cast plugs 129 can be welded (e.g., friction-stir welded) into respective components of the enclosure 110.

Figure 2D:
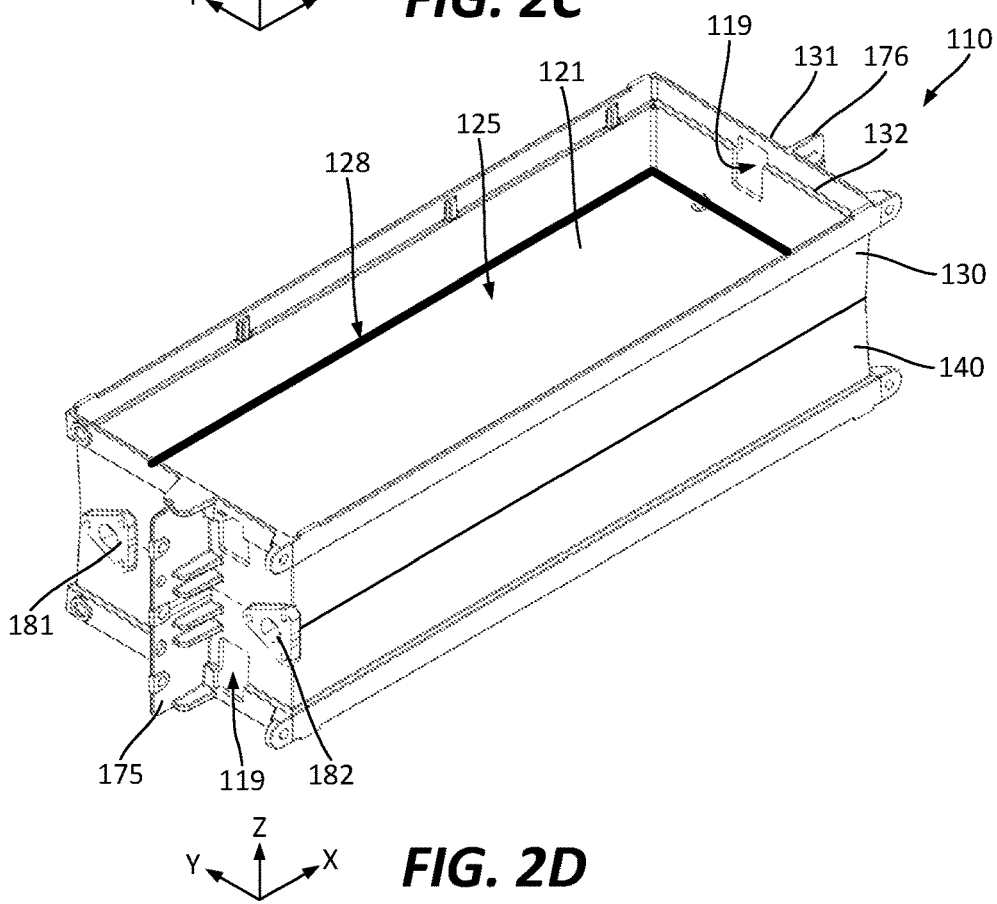
FIG. 2D is a schematic perspective view of yet another example of the enclosure in which the first thermal wall is friction-stir welded to the first set of side walls, in accordance with some examples.

Referring to FIG. 2D, in some examples, enclosure 110 does not have any post-cast plugs 129. Instead of using a dissolvable core, enclosure 110 is cast without the first thermal wall 121 (which can be cast separately). The first thermal wall 121 is then welded (e.g., friction-stir welded) to the first set of side walls 130, e.g., forming a friction-stir weld 128.

Referring to FIGS. 2B-2D, in some examples, thermal portion 120 further comprises a first fluid port 181 and a second fluid port 182 providing fluidic communication to thermal cavity 180. For example, the first fluid port 181 can be operable as an inlet port for a thermal fluid to enter thermal cavity 180, while the second fluid port 182 can be operable as an outlet for thermal fluid to exit thermal cavity 180. In more specific examples, the second fluid port 182 is positioned closer to the top edge 131 of the first set of side walls 130 than the first fluid port 181 thereby reducing the trapping of bubbles inside thermal cavity 180 when filling thermal cavity 180 with the thermal fluid.

Figure 3A:
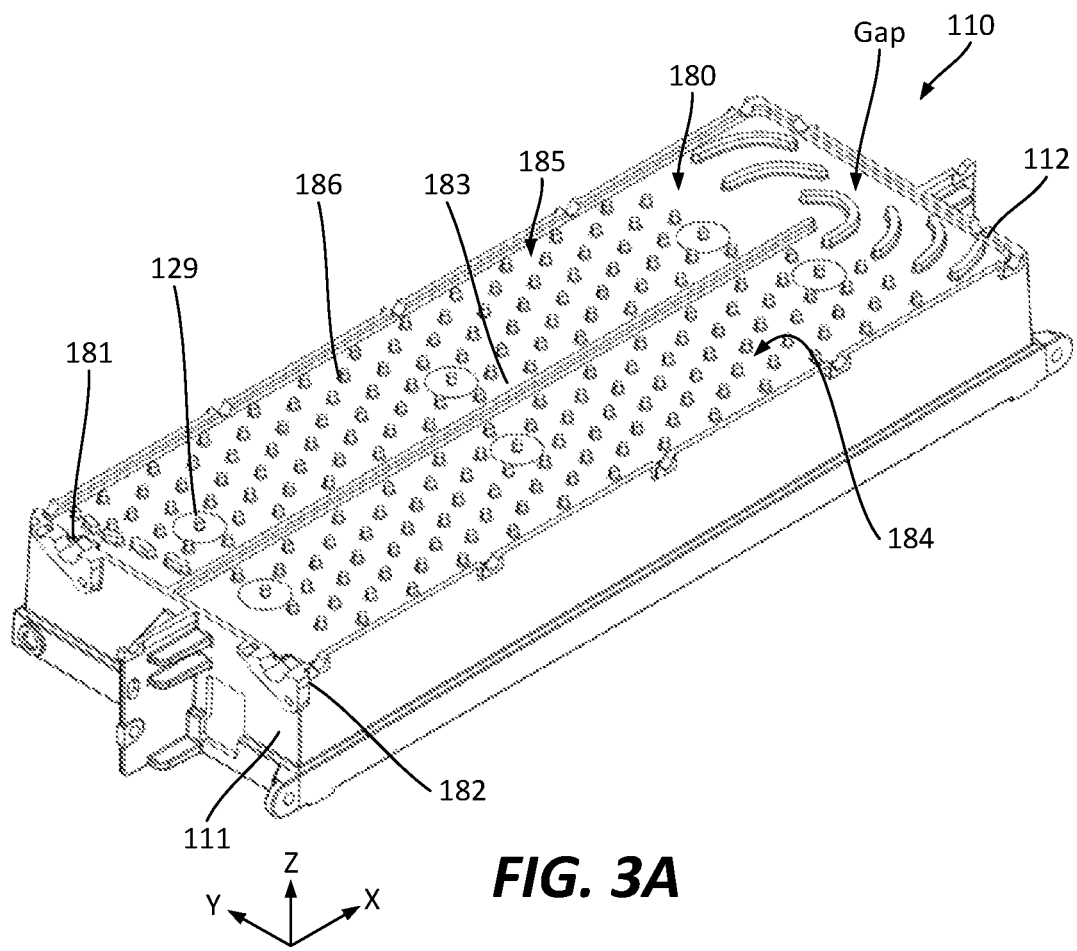
FIG. 3A is a schematic cross-sectional view of the battery module in FIG. 1A, in accordance with some examples.
Figure 3B:
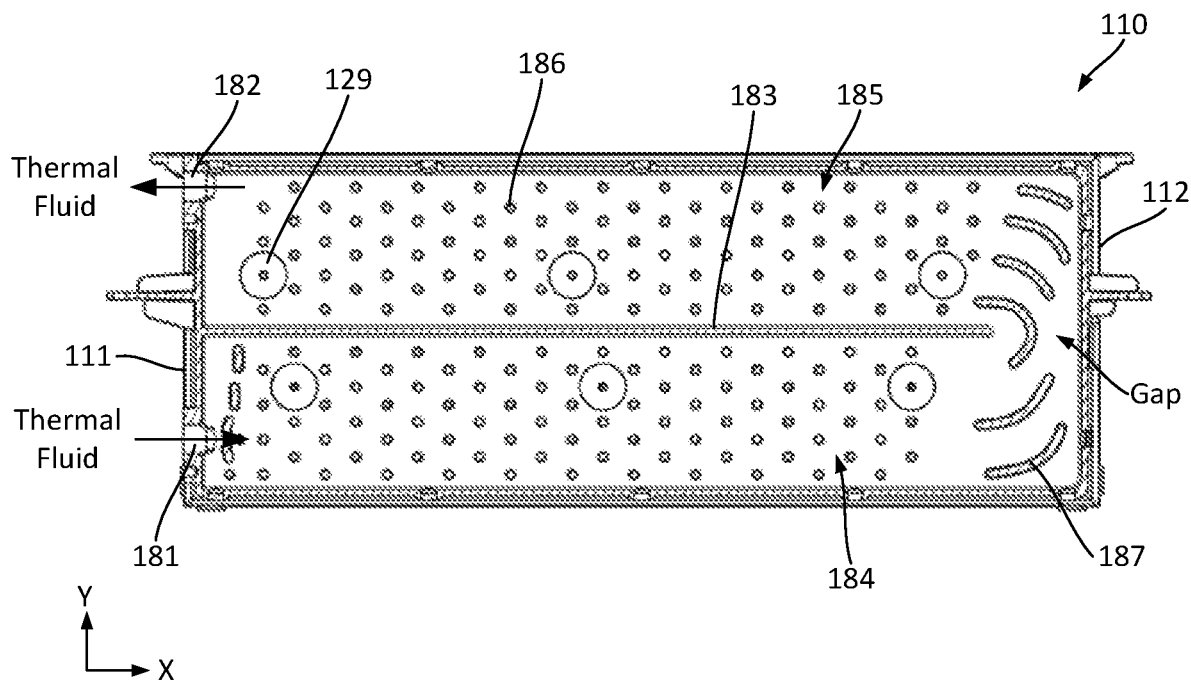
FIG. 3B is a top cross-sectional view of the battery module, in accordance with some examples.
Figure 3C:
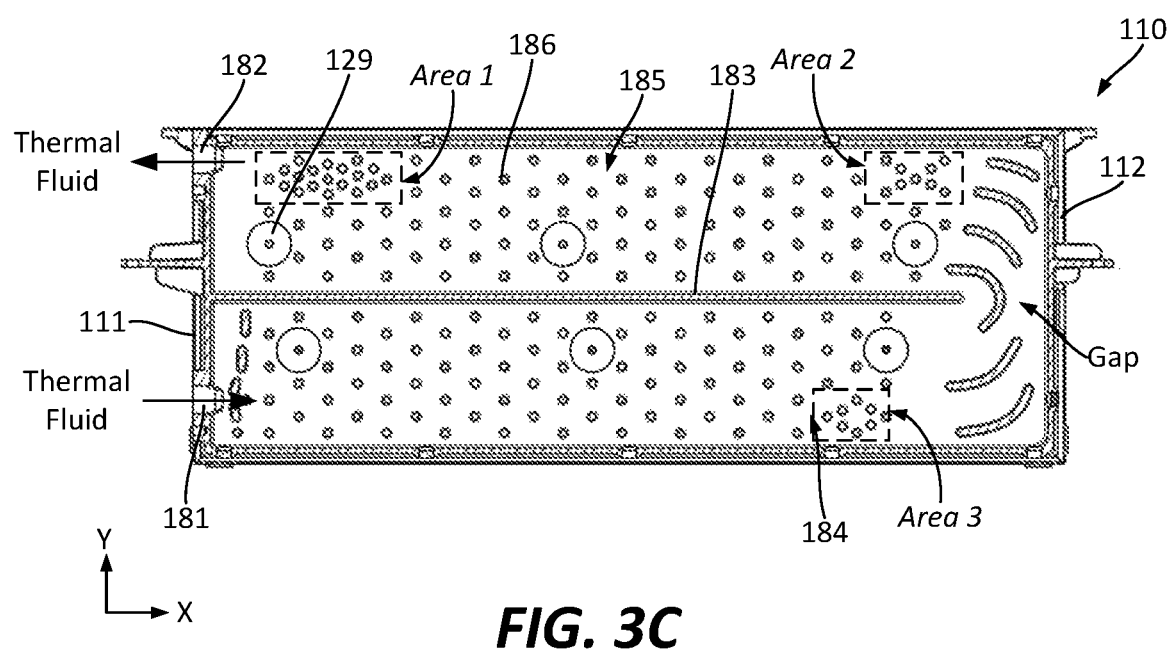
FIG. 3C is a top cross-sectional view of another example of the battery module.

Referring to FIGS. 3A-3C, in some examples, thermal portion 120 comprises a divider 183 extending through thermal cavity 180 between the first thermal wall 121 and the second thermal wall 122. The divider 183 is monolithic with the second thermal wall 122 and, in some examples (e.g., described above with reference to FIGS. 2B and 2C) with the first thermal wall 121. Alternatively, the first thermal wall 121 may contact, may be sealed against, or maybe even welded to the first thermal wall 121 (e.g., when the first thermal wall 121 is not a part of the remaining enclosure casting).

Referring to FIGS. 3A-3C, divider 183 at least partially separates thermal cavity 180 into the first cavity portion 184 and a second cavity portion 185. The first fluid port 181 extends into the first cavity portion 184, while the second fluid port 182 extends into the first cavity portion 185. Specifically, the first fluid port 181 and second fluid port 182 are positioned on the same side of the enclosure (i.e., first enclosure side 111). Specifically, enclosure 110 comprises a first enclosure side 111 and a second enclosure side 112. The divider 183 extends to the first enclosure side 111 and is separated by a gap from the second enclosure side 112 thereby providing a fluid path between the first cavity portion 184 and the second cavity portion 185 within the thermal cavity 180. A combination of the divider 183 and the gap allows the positioning of both fluid ports on the same side while circulating the thermal fluid through the entire thermal cavity 180. In some examples, the first thermal wall 121 and/or the second thermal wall 122 comprise flow redirectors 187 to direct the flow from the first cavity portion 184 to the second cavity portion 185 through the gap. Specifically, the thermal fluid flows in the direction of the X-axis in the first cavity portion 184 from the first enclosure side 111 to the second enclosure side 112. The flow redirectors 187 then redirect the fluid in the direction of the Y-axis and through the gap. The flow redirectors 187 then again redirect the fluid in the direction opposite of the X-axis when the fluid enters the second cavity portion 185. Finally, the thermal fluid flows through the second cavity portion 185 from the second enclosure side 112 to the first enclosure side 111.

Figure 4A:
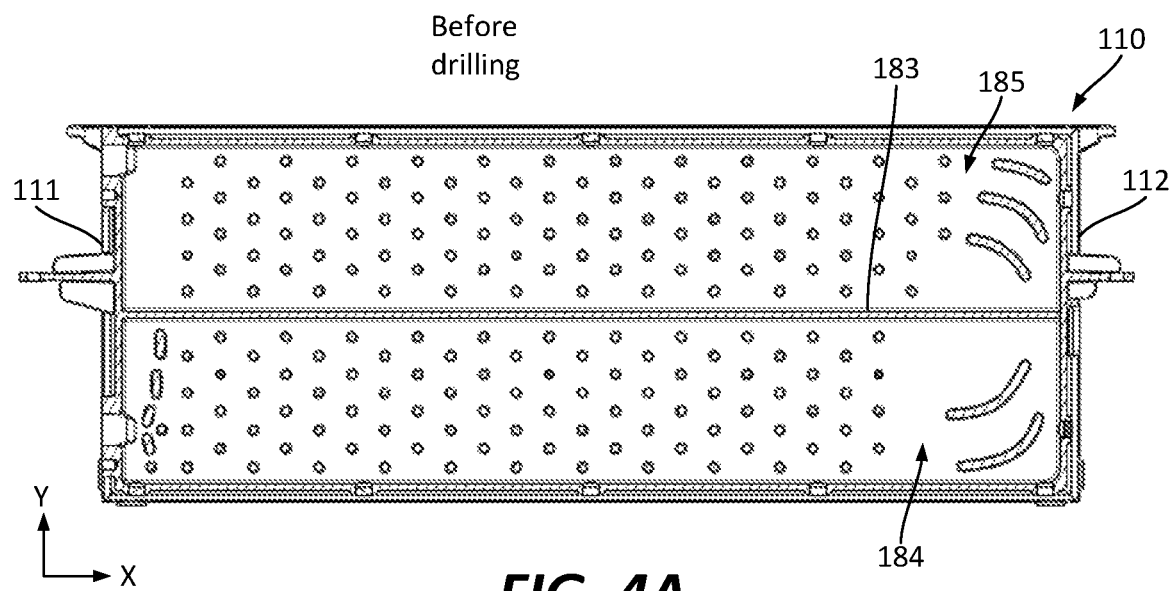
FIGS. 4A and 4B are top cross-sectional views of the battery module at different fabrication stages of this module, in accordance with some examples.

In some examples, when enclosure 110 is a monolithically cast component, enclosure 110 may initially (right after the casting) have a divider 183 that extends between the first enclosure side 111 and the second enclosure side 112, e.g., as schematically shown in FIG. 4A. In other words, at this stage, the first cavity portion 184 and the second cavity portion 185 are fluidically isolated from each other. This approach relies on two dissolvable cores when casting enclosure 110 thereby simplifying the casting process. One of these cores forms the first cavity portion 184, while the other core forms the second cavity portion 185.

Figure 4B:
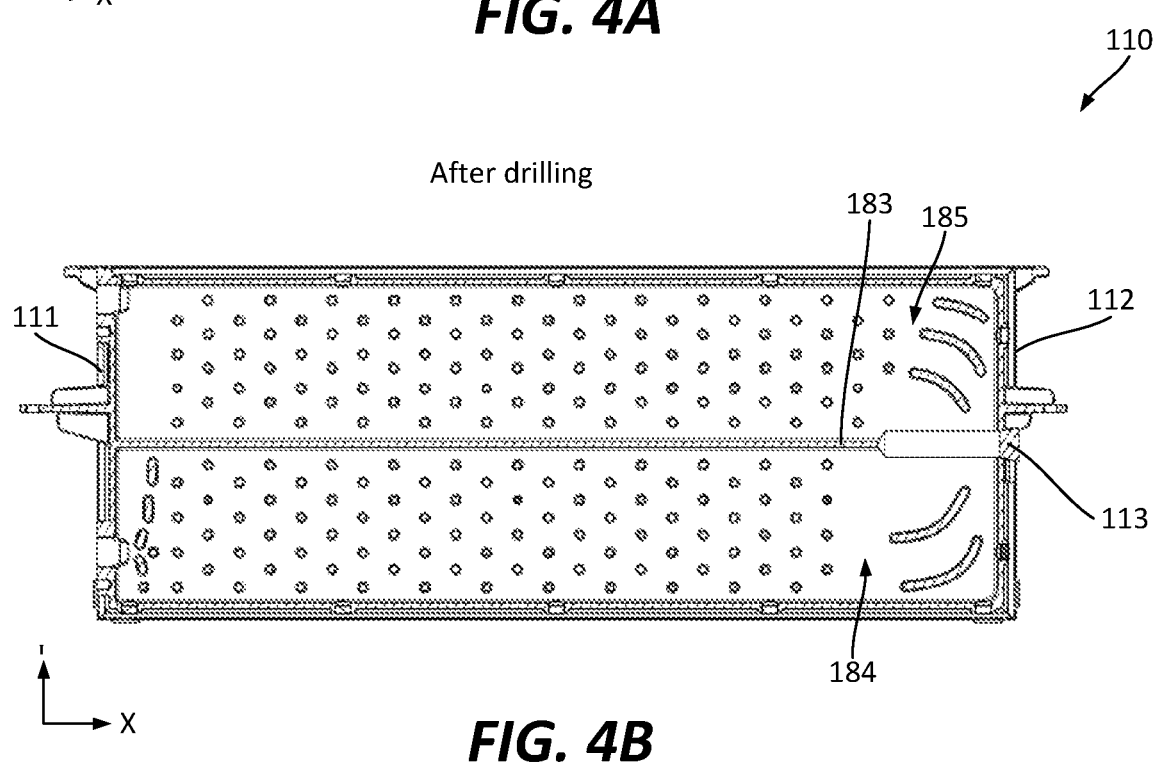

The fluidic communication between the first cavity portion 184 and the second cavity portion 185 is provided by drilling out a portion of divider 183 to form a gap between the divider 183 and the second enclosure side 112. A side plug 113 may be then installed into the opening in the second enclosure side 112, formed during this drilling, e.g., as schematically shown in FIG. 4B. As such, in some examples, the second enclosure side 112 has a side plug 113 coaxial with the divider 183.

Referring to FIGS. 3A-C, in some examples, the thermal portion 120 comprises a set of pins 186 extending through the thermal cavity 180 between the first thermal wall 121 and the second thermal wall 122. In some examples, these pins 186 are monolithic with the second thermal wall 122. In more specific examples, these pins 186 are also monolithic with the first thermal wall 121. Alternatively, these pins 186 may extend and even contact the first thermal wall 121 but not join the first thermal wall 121. These pins 186 can help to intermix/create some turbulence with the thermal fluid and to transfer heat between this thermal fluid (provided in the thermal cavity 180) and the battery cells 150 during the operation of battery module 100. Specifically, all these pins 186 increase the contact surface with the thermal fluid. Referring to FIG. 3C, in some examples, pins 186 has a non-uniform spatial density within thermal cavity 180 determined by the temperature, expected in each battery of the first set of battery cells 151 and the second set of battery cells 152. For example, the concentration of pins 186 can be proportional to the current through the battery cells 150 positioned in the same projection.

Examples of Fabricating Battery Modules

Figure 5:
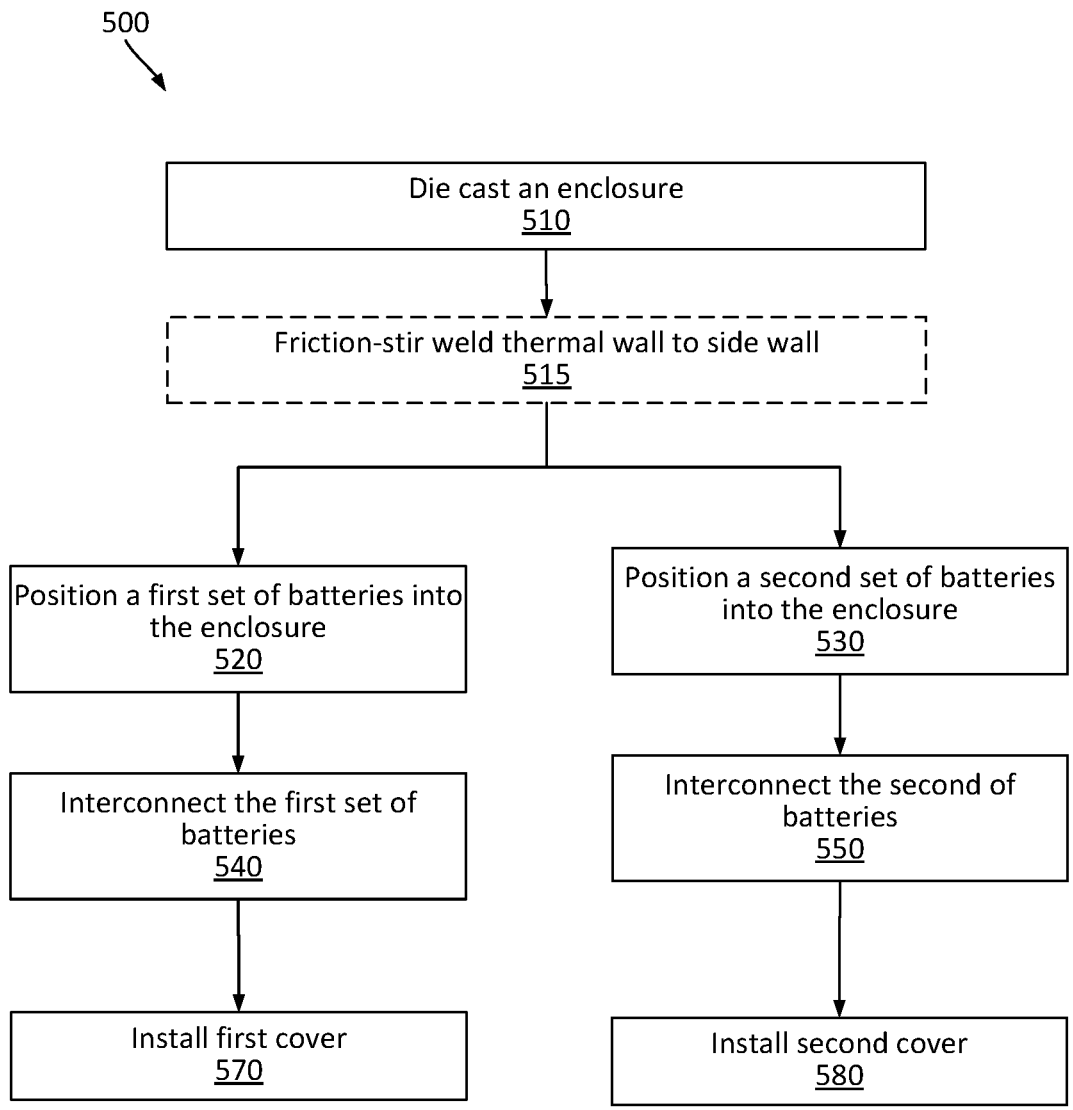
FIG. 5 is a process flowchart corresponding to a method of fabricating a battery module, in accordance with some examples.

FIG. 5 is a process flowchart corresponding to method 500 of fabricating a battery module 100, in accordance with some examples. Various examples of battery module 100 are described above with reference to FIGS. 1A-3C.

In some examples, method 500 comprises (block 510) die casting an enclosure 110 a first set of side walls 130, a second set of side walls 140, and a second thermal wall 122. In some examples, this die-casting operation also forms a first thermal wall 121. For example, a casting tool may have one or more dissolvable cores to form a thermal cavity 180. These cores are removed (after the casting) to free up the thermal cavity 180. When multiple dissolvable cores are used, different portions of the thermal cavity 180 may be interconnected as described above with reference to FIGS. 4A and 4B.

Alternatively, the first thermal wall 121 is not formed as a part of this die-casting operation (block 510). Instead, the first thermal wall 121 is formed in a separate operation and later attached to the first set of side walls 130. For example, method 500 may comprise (block 515) friction-stir welding the first thermal wall 121 to the first set of side walls 130 thereby forming the thermal cavity 180 during this welding operation.

In some examples, method 500 comprises forming insulating surface layers 125 on the external surfaces of the first thermal wall 121 and the second thermal wall 122. For example, plastic sheets may be positioned over these walls. Alternatively, insulating surface layers 125 may be provided in the form of a thermally-conductive epoxy and used to bond the battery cells 150 to their respective thermal walls.

Method 500 may proceed with (block 520) positioning a first set of battery cells 151 into the enclosure 110 or, more specifically, into the first enclosure portion 115. After this operation, the first set of battery cells 151 is surrounded by the first set of side walls 130, which protrude above the first set of battery cells 151. Furthermore, the first set of battery cells 151 is thermally coupled to the first thermal wall 121.

Method 500 may also comprise (block 530) positioning a second set of battery cells 152 into enclosure 110 or, more specifically, into the second enclosure portion 116. After this operation, the second set of battery cells 152 is surrounded by the second set of side walls 140 and thermally coupled to the second thermal wall 122.

Method 500 may proceed with (block 540) interconnecting the first set of battery cells 151 using a first interconnecting assembly 161. Specifically, at least a portion of the first interconnecting assembly 161 can be inserted into the first enclosure portion 115 and, in some examples, attached to the intermediate edge 132 of the first set of side walls 130. As such, this portion of the first interconnecting assembly 161 is surrounded and supported by the first set of side walls 130. The electrical leads of the first interconnecting assembly 161 can be then connected to the electrical terminals of each battery cell in the first set of battery cells 151. The configuration of conductive traces in the first interconnecting assembly 161 determines the connection scheme among the cells. Method 500 also comprises (block 550) interconnecting the second set of battery cells 152 using a second interconnecting assembly 162. This operation can be similar to the one described above with reference to block 540. In some examples, method 500 further comprises (block 570) installing the first cover 171 and (block 580) installing the second cover 172.

Battery Pack Examples

Figure 6A:
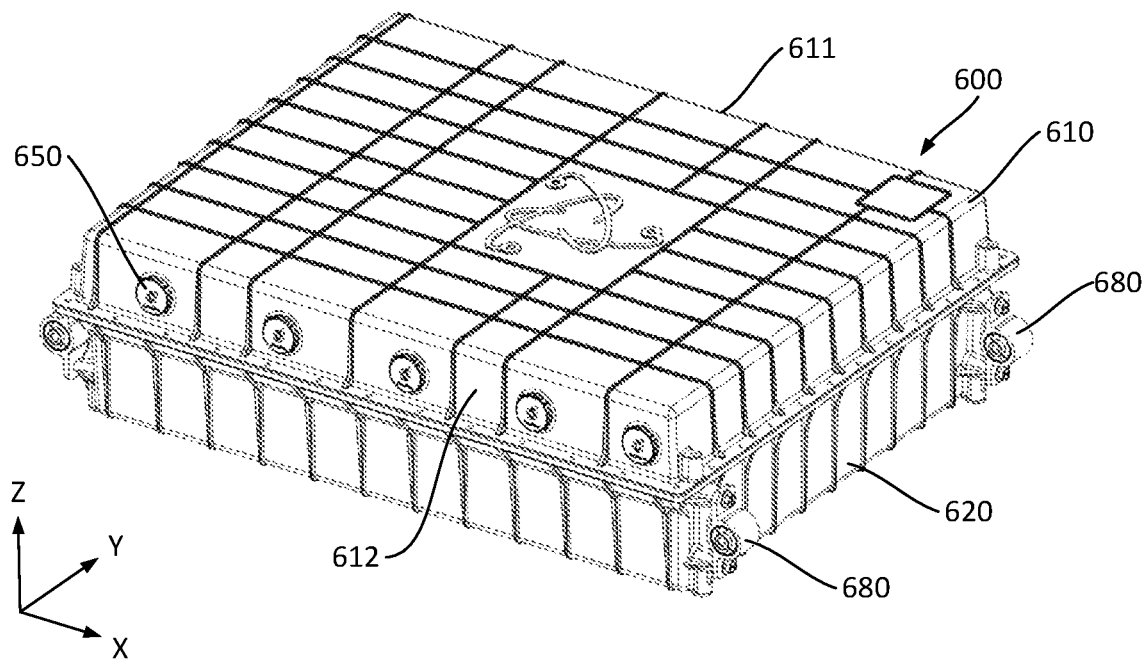
FIG. 6A is a schematic perspective view of a battery pack illustrating the first portion and second portion of the pack as well as pressure-relief valves positioned on the first portion and support bushings attached to the second portion, in accordance with some examples.
Figure 6B:
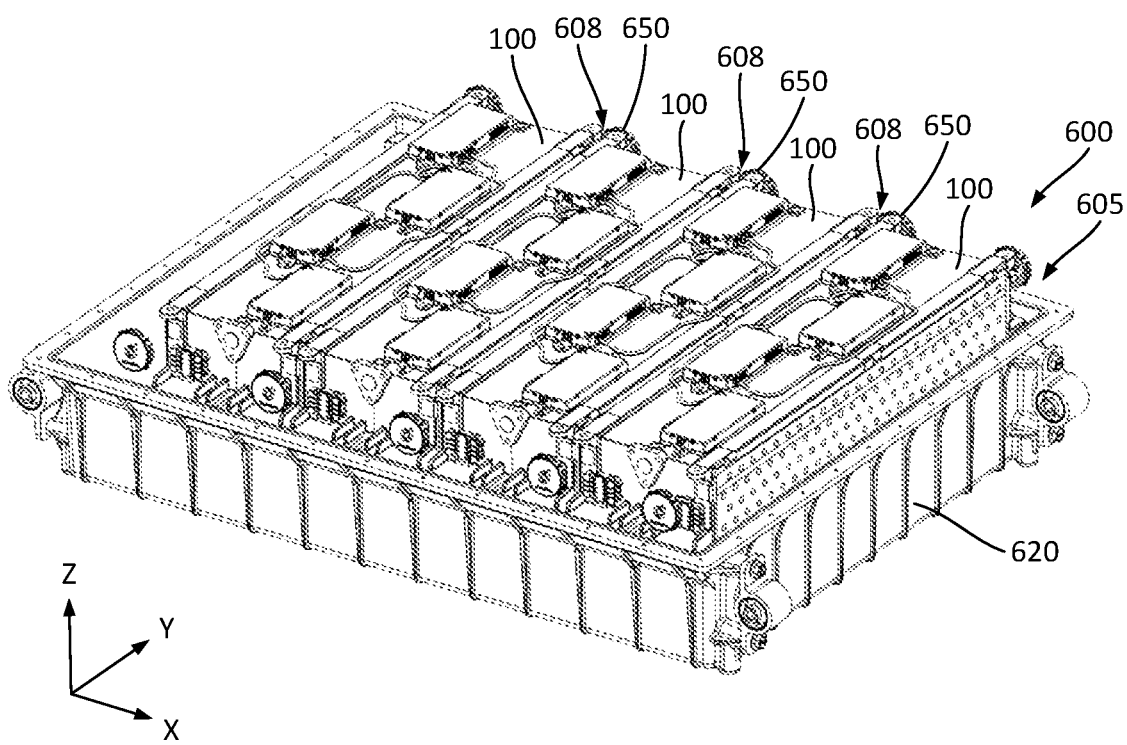
FIG. 6B is a schematic perspective view of the battery pack in FIG. 6A with the first portion removed to illustrate battery modules positioned within the enclosed cavity formed by the two portions, in accordance with some examples.

Referring to FIGS. 6A and 6B, in some examples, a battery pack 600 comprises a first battery-pack portion 610 and a second battery-pack portion 620. The first battery-pack portion 610 and second battery-pack portion 620 may be also referred to as batter-pack shells, pack-enclosure portions, and the like. The second battery-pack portion 620 can be attached (e.g., sealably attached) to the first battery-pack portion 610 such that the two portions form an enclosed pack cavity 605.

Battery pack 600 also comprises a set of battery modules 100 positioned within enclosed pack cavity 605. Various examples of battery module 100 are described above with reference to FIGS. 1A-3C. Each pair of adjacent battery modules 100 is separated by a module gap 608. Furthermore, a module gap 608 can also extend between a battery module 100 and any other components of the battery pack 600, a BMS module, the interior surface of the first battery-pack portion 610, and the interior surface of the second battery-pack portion 620. These module gap 608 are further described below with reference to FIGS. 7A-7E. Specifically, these module gaps 608 can be used to evacuate any gases generated during a thermal event in one or more of battery modules 100. Referring to FIG. 7E, in some examples, an insulation structure 609 is positioned in each module gap 608.

Examples of Pressure-Relief Valves in Battery Packs

Referring to FIGS. 6A and 6B, in some examples, the battery pack 600 comprises a set of pressure-relief valves 650 positioned in and protruding through the wall of the first battery-pack portion 610. In specific examples, all pressure-relief valves 650 are positioned on the same portion, i.e., the first battery-pack portion 610. Alternatively, a subset of the pressure-relief valves 650 is also positioned on the second battery-pack portion 610.

Each pressure-relief valve 650 is configured to provide a fluid path from the enclosed pack cavity 605 to the environment outside of the battery pack 600 when the pressure inside enclosed pack cavity 605 is at or exceeds a set threshold. On the other hand, enclosed pack cavity 605 is fluidically isolated from the environment when the pressure inside enclosed pack cavity 605 is below the set threshold. As such, water and other environmental elements are not able to enter the pack cavity 605 and the battery pack 600 remains sealed.

This pressure (inside the enclosed pack cavity 605) can increase due to a thermal event in one or more cells (positioned inside one or more of the battery modules 100). The thermal event can be triggered by the internal/external short, overcharge, and the like. The thermal event can cause these cells to release gases thereby pressurizing the enclosed pack cavity 605. Without the pressure release, the battery pack 600 can be severely damaged and cause damage to surrounding structures, e.g., an electric vehicle. It should be noted that the speed with which the gases are delivered from the battery cells 150 to the pressure-relief valves 650 is important to reduce any internal damage to the battery pack 600 (e.g., propagate this thermal event to other battery modules 100 and/or battery cells 150).

In some examples, each pressure-relief valve 650 is coaxial with a corresponding module gap 608 e.g., as schematically shown in FIGS. 6B and 7B-7E. For example, FIG. 7E illustrates battery module 100 comprising one battery cell 150 (top right), which releases gases into module gap 608. In some examples, battery cell 150 is separated from module gap 608 by module cover 170, which can be specially configured to allow any gases to escape from the module enclosure (formed in part by module cover 170) into module gap 608. Various examples of module cover 170 are described above with reference to the first cover 171 and the second cover 172. For example, the first cover 171 of one module may face and form a module gap 608 with the second cover 172 of the adjacent module. As noted above, an insulation structure 609 may be positioned in module gap 608, e.g., between the module covers 170 as shown in FIG. 7E. For example, a mica sheet (e.g., phyllosilicate) can be used as the insulation structure 609.

Referring to FIGS. 6B and 7B, in some examples, each battery module 100 is positioned between two module gaps 608. Specifically, each battery module 100 may have two sets of battery cells 150, e.g., positioned on different sides of the thermal plate as described above. Each set of battery cells 150 is protected by a corresponding module cover (e.g., first cover 171 and second cover 172). These module covers allow gases to escape from battery cells 150 and corresponding battery modules 100 into enclosed pack cavity 605. As such, module gap 608 can be positioned between two module covers (e.g., first cover 171 of one battery module 100 and second cover 172 of the adjacent battery module 100). Furthermore, each module cover can face module gap 608.

Figure 7D:
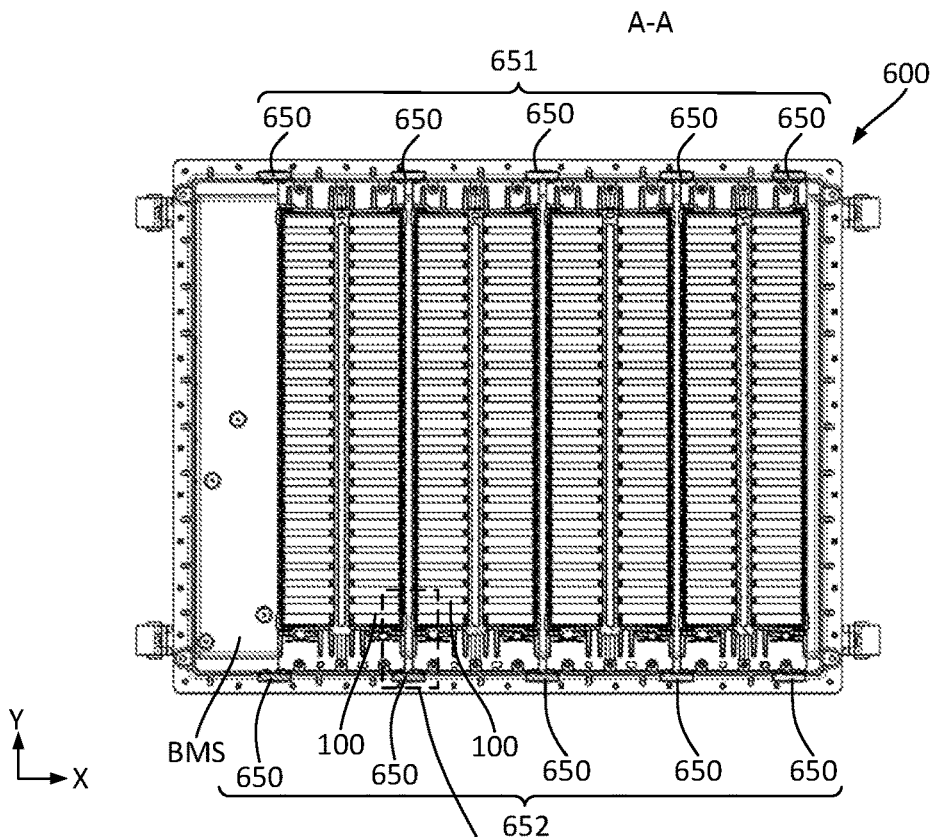
FIG. 7D is a schematic top cross-sectional view of the battery pack in FIG. 6A, in accordance with some examples.
Figure 7E:
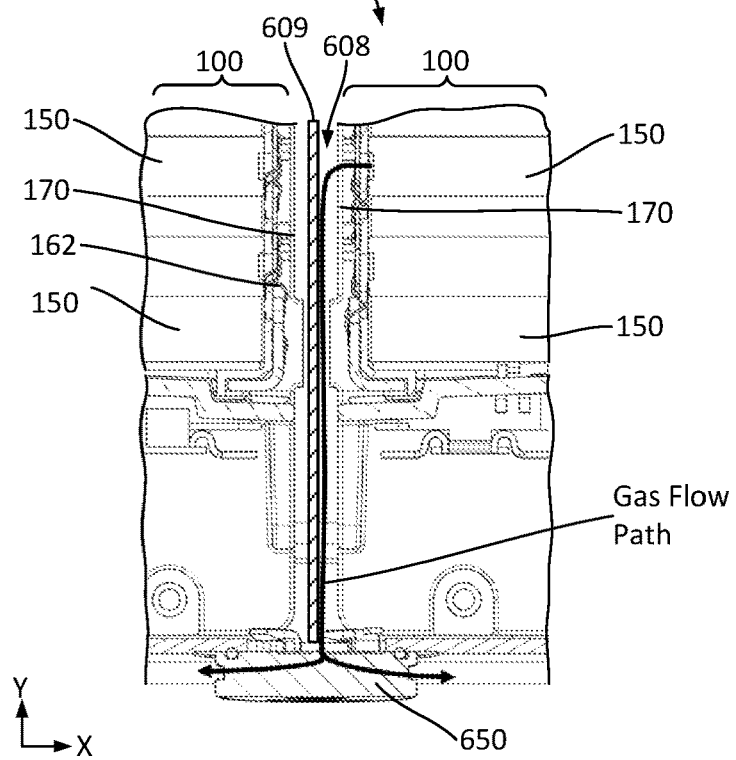
FIG. 7E is an expanded view of a part of the battery pack in FIG. 7D, which illustrates a gap between two adjacent modules, an isolation structure position in the gap, and the orientation of a pressure-relief valve relative to this gap, in accordance with some examples.

Referring to FIG. 7D, in some examples, pressure-relief valves 650 comprises a first subset of pressure-relief valves 651 and a second subset of pressure-relief valves 652. The wall of the first battery-pack portion 610 comprises a first sidewall 611 and a second sidewall 612, opposite the first sidewall 611. The first subset of pressure-relief valves 651 is positioned in and protruding through the first sidewall 611. The second subset of pressure-relief valves 652 is positioned in and protruding through the second sidewall 612. Positioning the pressure-relief valves on both sides reduces the travel of any gases released into the module gaps 608 and provides an additional escape outlet as well as backup. In other words, each module gap 608 is serviced by two pressure-relief valves 650 (one valve in the first subset of pressure-relief valves 651 and another valve in the second subset of pressure-relief valves 652). In some examples, each of the first subset of pressure-relief valves 651 and the second subset of pressure-relief valves 652 consists of five pressure-relief valves. In the same or other examples, battery pack 600 has only 4 battery modules 100.

Examples of Liquid Cooling in Battery Packs

Figure 8A:
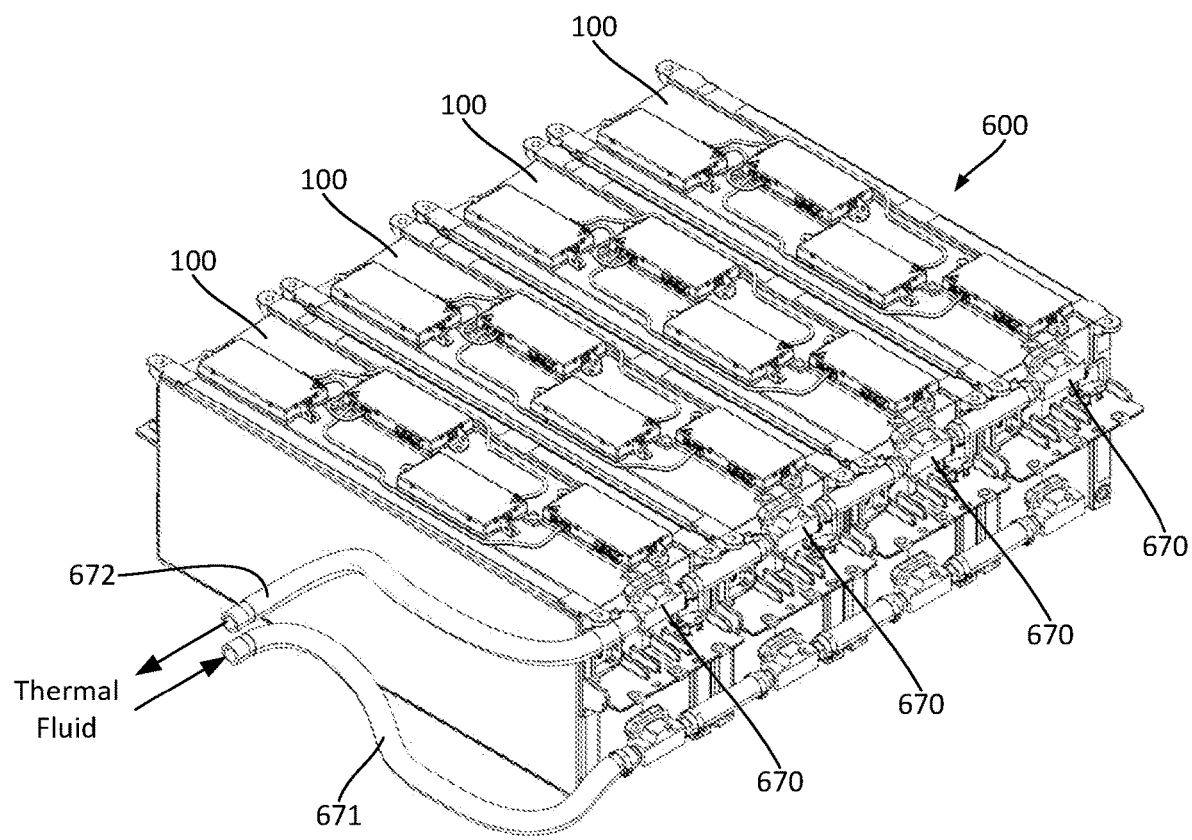
FIG. 8A is a schematic perspective view of battery modules fluidically coupled to pack inlet and outlet tubes using controllable valves, in accordance with some examples.
Figure 8B:
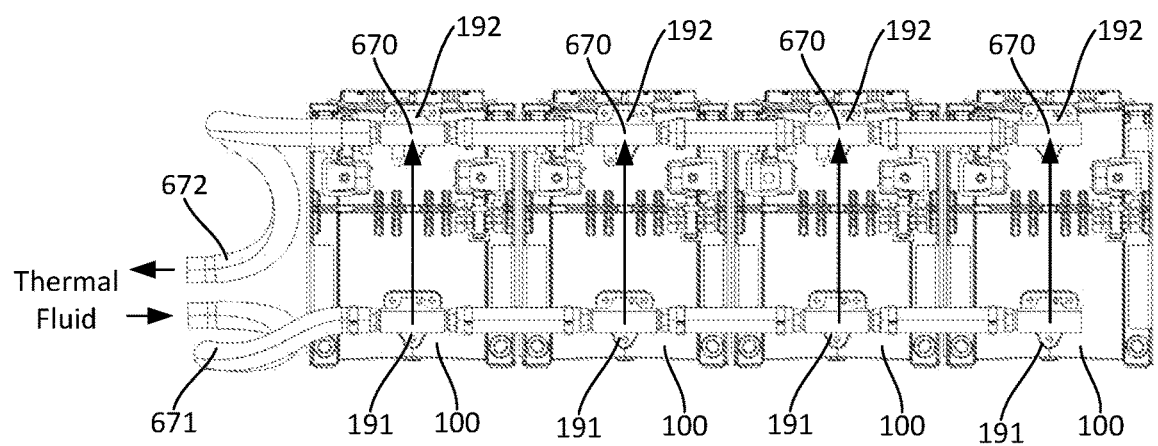
FIG. 8B is a schematic side view of the battery modules in FIG. 8A, in accordance with some examples.

Referring to FIGS. 8A and 8B, in some examples, the battery module 100 of a battery pack 600 are liquid cooled. As described above, battery pack 600 comprises pack inlet tube 671 and pack outlet tube 672 used to flow a thermal fluid within battery pack 600 or, more specifically, to deliver this thermal fluid to each battery module 100. Each battery module 100 is equipped with inlet port 191 and outlet port 192, which are fluidically coupled with a thermal plate positioned between the two sets of battery cells. The design of the thermal plate and the internal liquid routing is described above.

Pack inlet tube 671 is fluidically coupled to inlet port 191 of each battery module 100, while pack outlet tube 672 is fluidically coupled to outlet port 192 of each battery module 100. Battery pack 600 can also comprise a set of controllable valves 670 such that each valve 670 provides a selective fluid pathway between pack inlet tube 671 and inlet port 191 and/or between pack outlet tube 672 and outlet port 192. FIG. 4B illustrates controllable valves 670 being positioned at and controlling the flow through each outlet port 192. However, an example wherein controllable valves 670 are positioned at and control the flow through inlet port 191 is also within the scope. As such, the flow rate of the thermal fluid through each battery module 100 can be independently controlled. The operation of the controllable valves 670 is described below with reference to FIG. 9, e.g., using temperature feedback from each battery module 100.

In some examples, each controllable valve 670 can be replaced with a constant-flow restrictor. Each constant-flow restrictor can be selected such that the volumetric flow rate through each battery module 100 is the same regardless of the module position. For example, a battery module positioned the furthest from the beginning of the pack inlet tube 671 and the pack outlet tube 672 may have the least restrictive constant-flow restrictor, i.e., to compensate for pressure losses in t the pack inlet tube 671 and the pack outlet tube 672.

Examples of Electric Vehicles and Vehicle Power Systems

Figure 9:
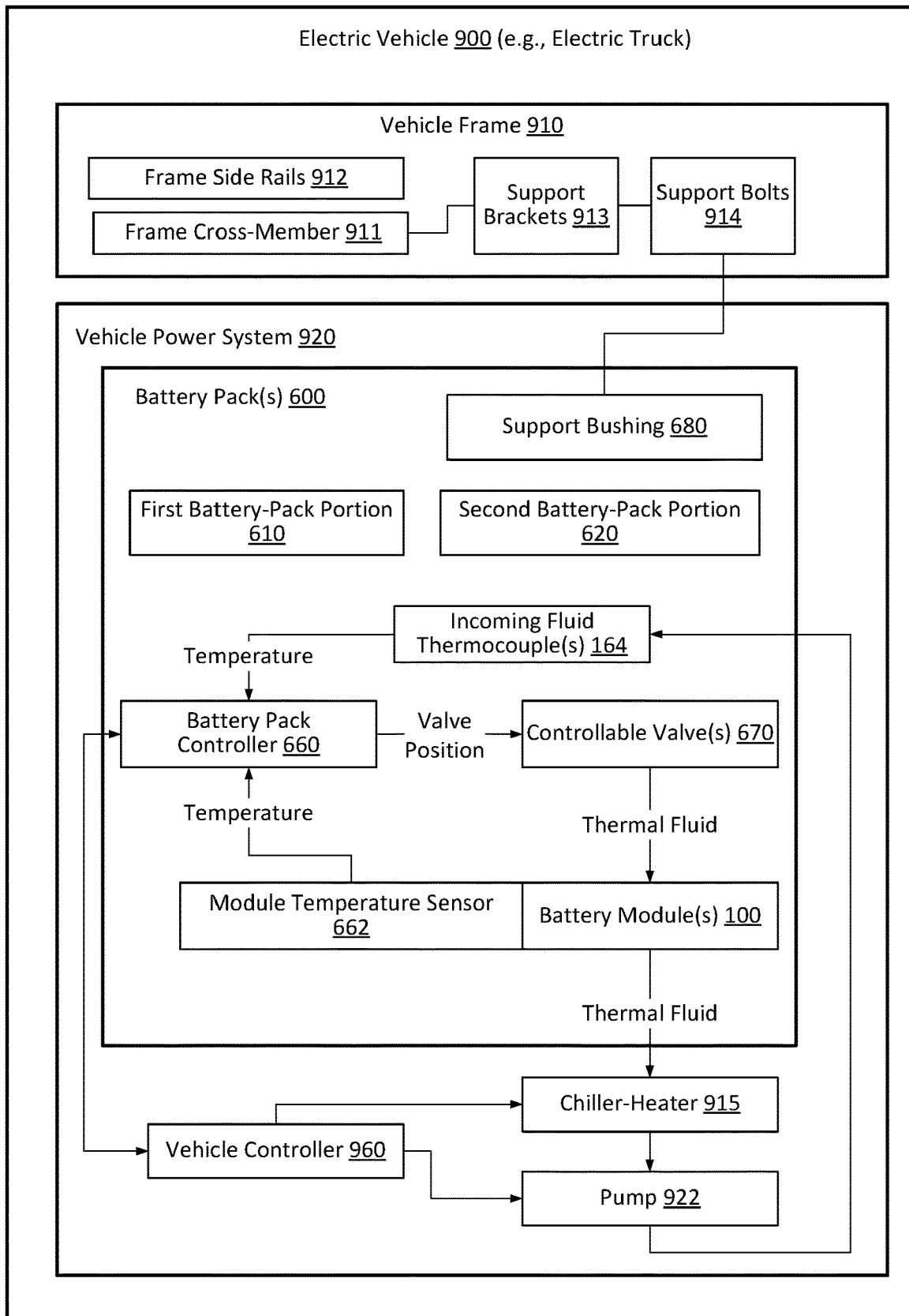
FIG. 9 is a block diagram of an electric vehicle, illustrating various vehicle systems, in accordance with some examples.

FIG. 9 is a block diagram of an electric vehicle 900 comprising a vehicle power system 920, in accordance with some examples. Specifically, the electric vehicle 900 comprises a vehicle frame 910, which may support various components of the vehicle power system 920, such as battery packs 600. Vehicle frame 910 can comprise frame side rails 912 and frame cross-members 911 that interconnect frame side rails 912. Vehicle frame 910 can also comprise support brackets 913 that utilize support bolts 914 for attaching the battery packs 600 or, more specifically, for attaching the support bushings 680 of the battery packs 600. Additional details of the vehicle frame 910 and of various attachment options are described below with reference to FIGS. 10A-11C.

Referring to FIG. 9, in some examples, battery pack 600, which is a part of the vehicle power system 920, further comprises module temperature sensors 662 (e.g., thermocouples) configured to measure the temperature at one or more locations in each battery module 100. The locations can be specifically selected based on the operating regime of each battery module 100 and/or that of the battery pack 600. For example, certain battery cells 150 in the battery module 100 can be subjected to higher currents. In these examples, the module temperature sensor 662 can be positioned around these cells.

In some examples, battery pack 600 further comprises one or more temperature sensors for measuring the temperature of the thermal fluid in various locations within the battery pack 600. For example, one or more temperature sensors can be positioned at the inlet port 191 and outlet port 192 of each module, e.g., to determine the heat output of each module and potentially detect and prevent various undesirable operating conditions associated with each battery module 100.

In some examples, the output of various temperature sensors can be received at a battery pack controller 660, which in some cases may be also referred to as a battery management system (BMS). In some examples, the battery pack controller 660 is also communicatively coupled to a vehicle controller 960. The battery pack controller 660 and/or the vehicle controller 960 can provide operational instructions to controllable valves 670 (if such are used). For example, each controllable valve 670 can be made more open or closed (or completely opened or closed) based on the temperature reading from the module temperature sensor 662. Specifically, battery pack controller 660 can be configured to (1) receive the temperature of the thermal fluid entering each battery module 100, the temperature of the thermal fluid exiting each battery module 100, and the position of each controllable valve 670, and to (2) calculate the total heat transferred in each battery module 100.

In some examples, the electric vehicle 900 also comprises a chiller-heater 915 for changing the temperature of the thermal fluid outside of the battery packs 600. For example, a chiller-heater 915 can comprise a radiator for releasing heat to the environment, an air conditioning/heat pump for cooling the thermal fluid below the temperature of the environment, a heater for heating the thermal fluid, and the like. In some examples, the electric vehicle 900 also comprises a pump 922 for pumping the thermal fluid between the chiller-heater 915 and the battery packs 600.

Examples of Integrating Battery Packs into Electric Trucks

Referring to FIGS. 10A-10F and 11A-11C, in some examples, battery packs 600 are integrated into electric vehicle 900 comprising a vehicle frame 910. As noted above, the vehicle frame 910 can comprise two side rails 912 and set of cross-members 911, each extending perpendicular to and interconnecting two side rails 912. Electric vehicle 900 also comprises a set of battery packs 600, enclosed within and attached to vehicle frame 910. As such, the vehicle frame 910 not only supports but also protects the battery packs 600 (e.g., during the collision of the electric vehicle 900). Furthermore, the vehicle frame 910 can be reinforced by the battery packs 600 (e.g., the battery packs 600 are operable as structural components of the frame 910)

Various examples of battery packs 600 are described above. In some examples, each battery pack 600 comprises first battery-pack portion 610, second battery-pack portion 620, attached to first battery-pack portion 610 and forming enclosed pack cavity 605 with first battery-pack portion 610, and set of battery modules 100 positioned within enclosed pack cavity 605.

Figure 10A:
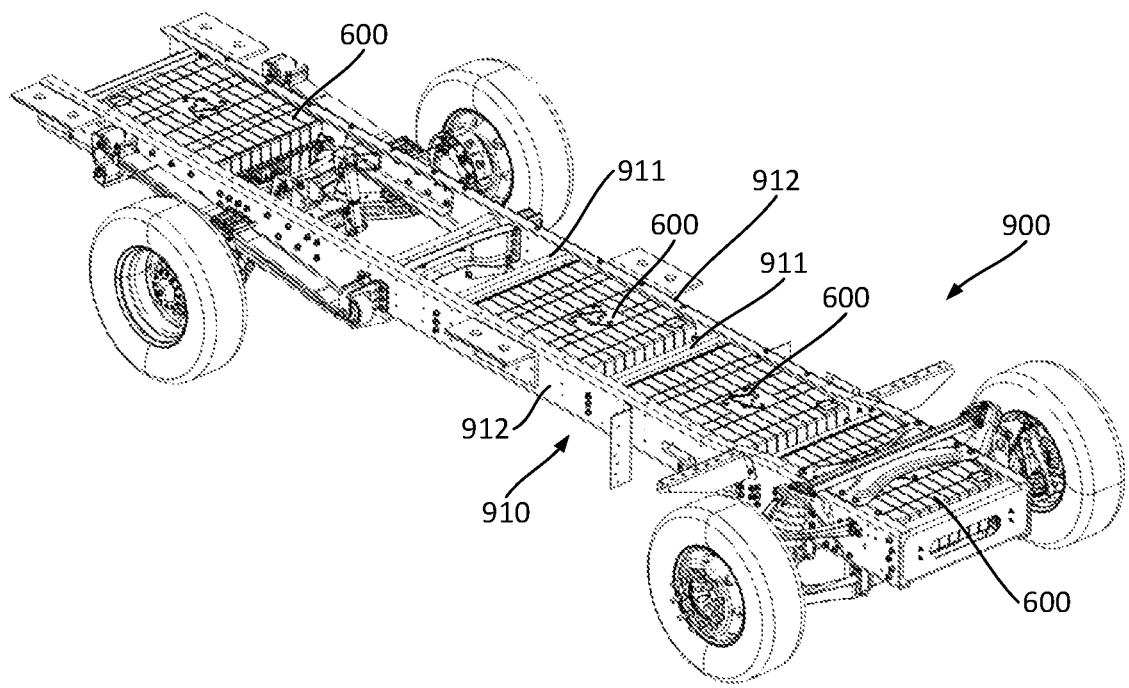
FIG. 10A is a schematic perspective view of an electric vehicle comprising a frame and a set of battery packs, enclosed within and attached to the frame, in accordance with some examples.
Figure 10B:
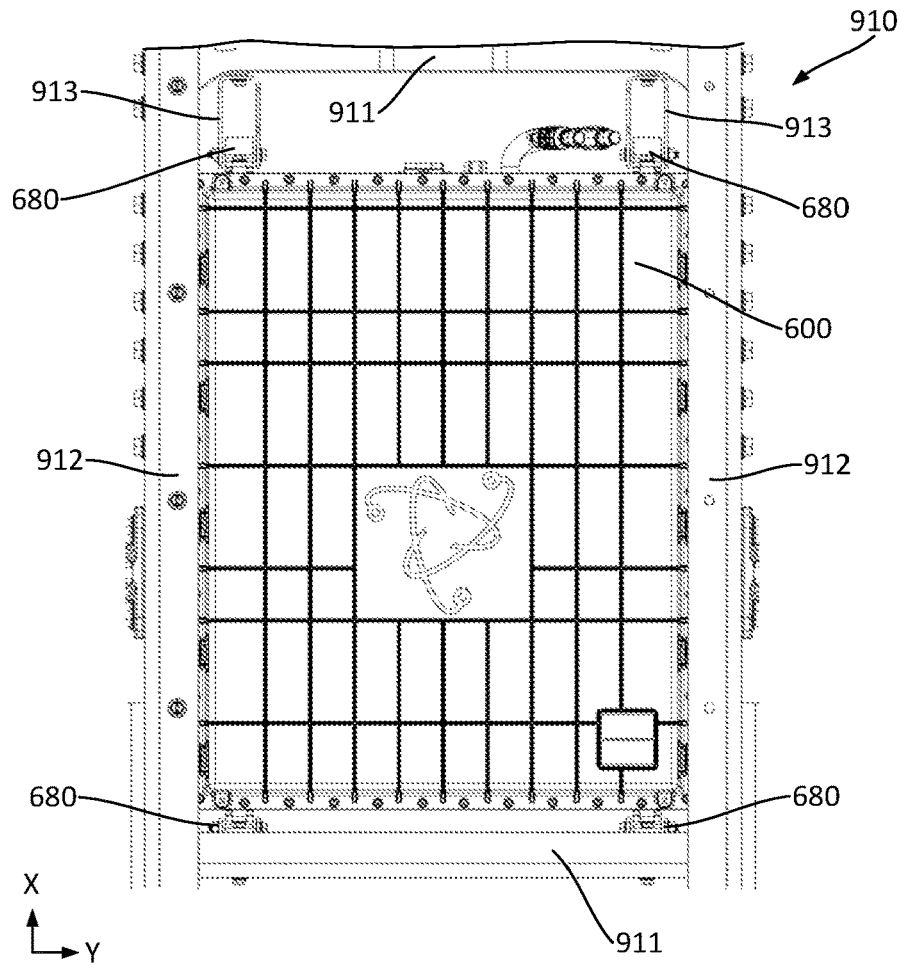
FIG. 10B is a schematic top view of a portion of the vehicle frame and one battery pack in FIG. 10A.
Figure 10C:
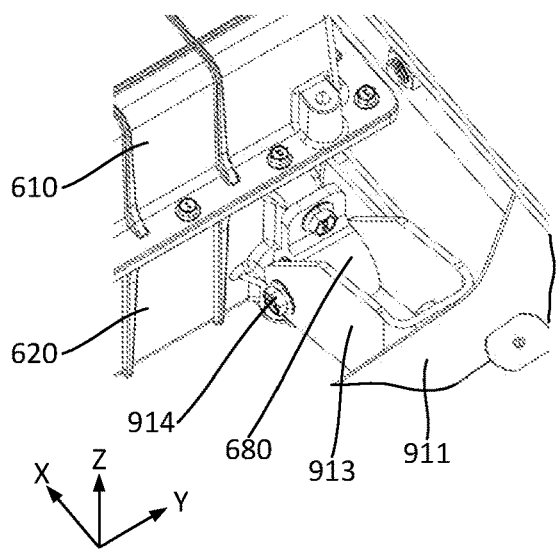
FIG. 10C is a schematic perspective view of a support assembly used for attaching a battery pack to a vehicle frame, in accordance with some examples.
Figure 10D:
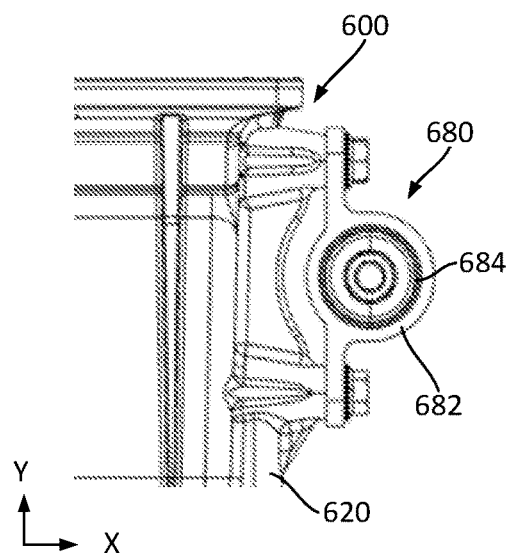
FIG. 10D is a schematic side view of a support bushing, which is a part of the support assembly in FIG. 10C.
Figure 10E:
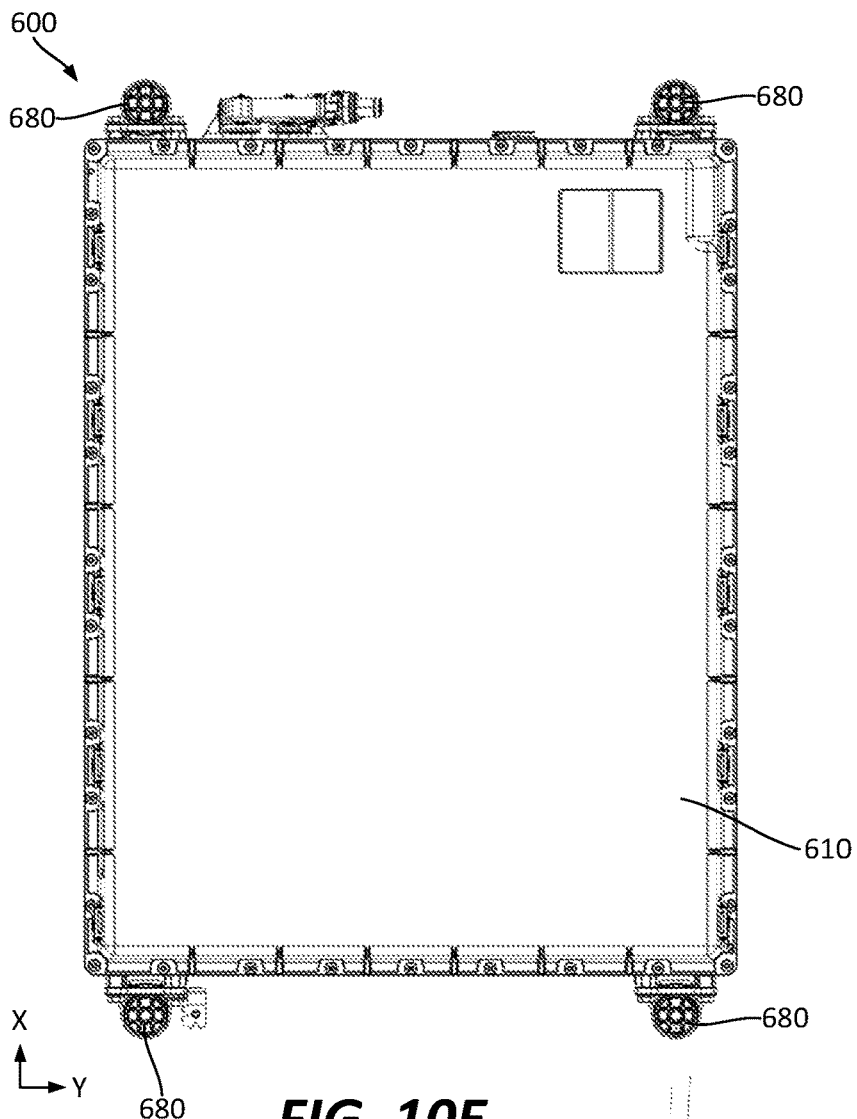
FIG. 10E is a schematic top view of another example of a battery pack, in accordance with some examples.
Figure 10F:
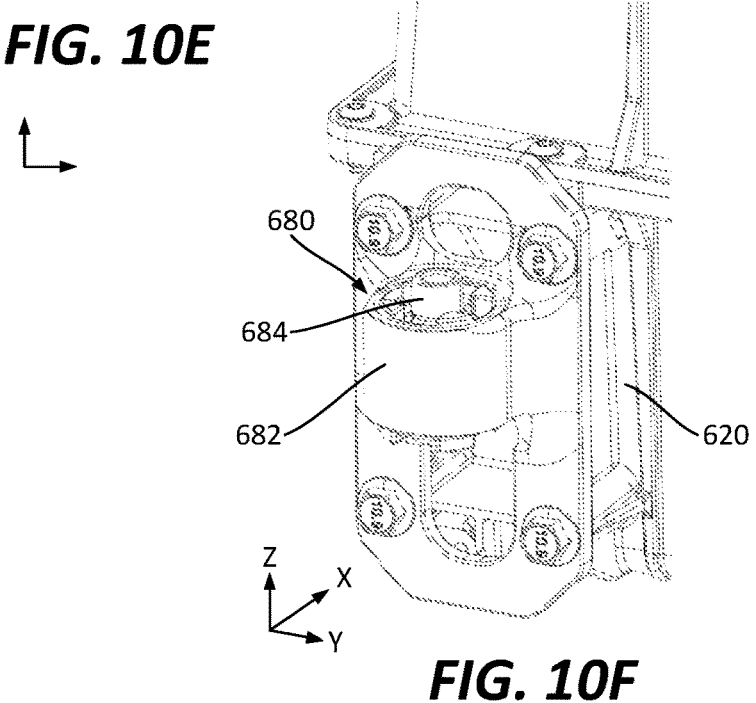
FIG. 10F is a schematic perspective view of another example of a support assembly used for attaching the battery pack to a vehicle frame, in accordance with some examples.

Referring to FIGS. 10B-10D, in some examples, the battery packs 600 or, more specifically, the second battery-pack portion 620 comprises support bushings 680 for attaching to the vehicle frame 910. Each support bushing 680 can be positioned adjacent to one corner of the second battery-pack portion 620. Referring to FIG. 10D, in some examples, support bushing 680 comprises (a) rigid bushing enclosure 682 bolted to the wall of second battery-pack portion 620, and (d) elastomeric bushing 684 supported and surrounded by rigid bushing enclosure 682. Referring to FIG. 10C, in some examples, support bushing 680 is pivotably attached to support bracket 913 by a support bolt 914 that protrudes through support bushing 680. In this example, the support bolt 914 extends parallel to the cross-members 911 and parallel to the frame plane (the X-Y plane). FIGS. 10E and 10F illustrate another example of the support bushing 680, which is configured to receive a support bolt 914 (not shown) extending perpendicular to the cross-members 911 and perpendicular to the frame plane (the X-Y plane). This example may simplify the process of mounting of battery packs 600 on the frame and may also provide more damping (using the elastomeric bushing 684) in the direction perpendicular to the frame plane (the X-Y plane).

Figure 11A:
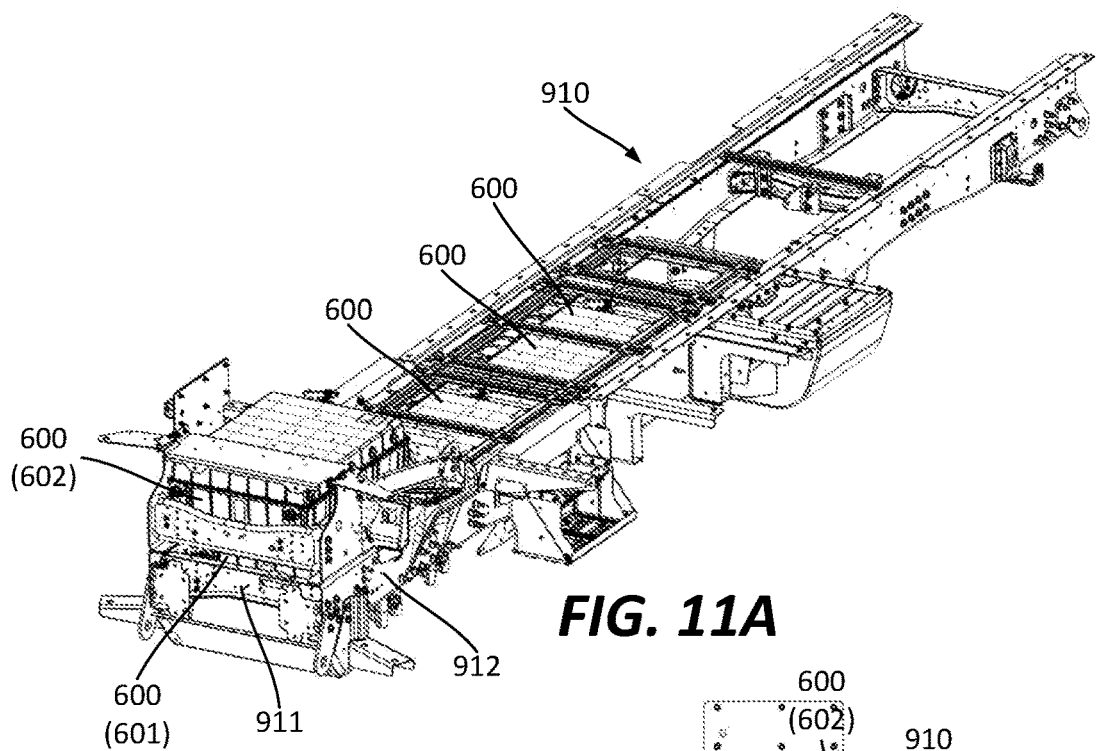
FIG. 11A is a schematic perspective view of a frame and a set of battery packs, with two packs stacked in the front portion of the frame, in accordance with some examples.
Figure 11B:
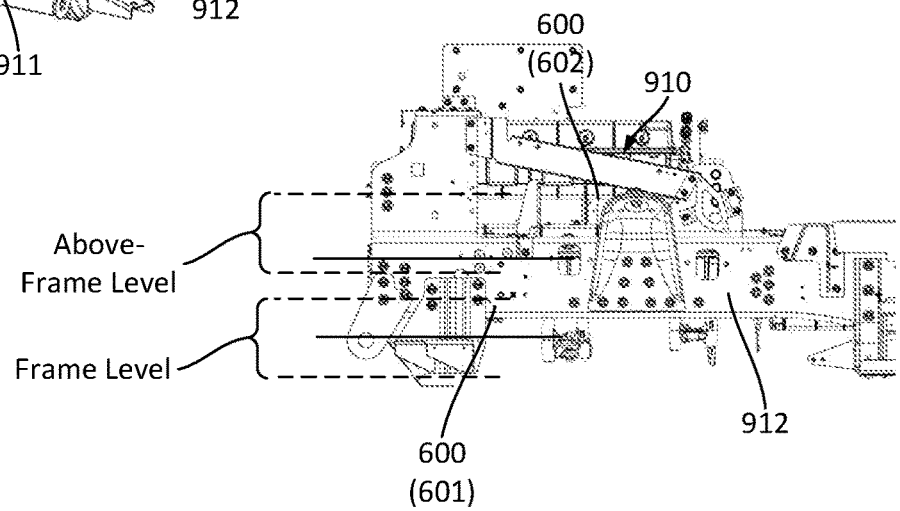
FIG. 11B is a schematic side view of the frame and two stacked battery packs of FIG. 11A, in accordance with some examples.
Figure 11C:
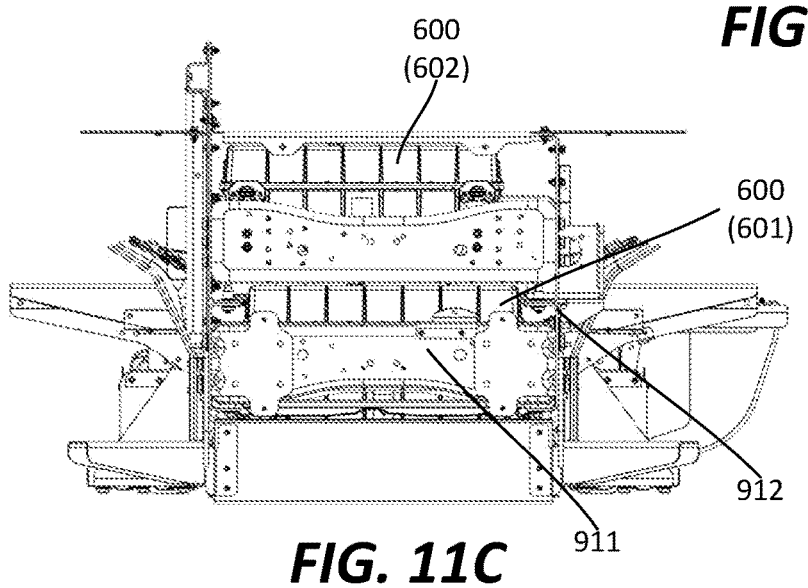
FIG. 11C is a schematic front view of the frame and two stacked battery packs of FIG. 11A, in accordance with some examples.

FIG. 11A is a schematic perspective view of frame 910 and a set of battery packs 600, with two packs stacked in the front portion of frame 910, in accordance with some examples. FIG. 11B is a schematic side view of frame 90 and the two stacked battery packs of FIG. 11A, while FIG. 11C is a corresponding front view. Specifically, the first battery pack 601 is positioned within frame 910, e.g., between the side rails 912. The second battery pack 602 is positioned above frame 910 and is connected to the frame by a pack-supporting structure. This pack configuration is particularly beneficial for electric trucks, which tend to have uneven weight distribution when loaded.

CONCLUSION

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present embodiments are to be considered illustrative and not restrictive.

The invention claimed is:

1. A battery pack comprising:
a first portion;
a second portion, attached to the first portion and forming an enclosed cavity with the first portion;
a set of battery modules positioned within the enclosed cavity and separated by a set of module gaps; and
a set of pressure-relief valves positioned in and protruding through a wall of the first portion, wherein each valve in the set of pressure-relief valves is configured to provide a fluid path from the enclosed cavity to environment outside of the battery pack when pressure inside the enclosed cavity is at or exceeds a set threshold and is further configured to fluidically isolate the enclosed cavity from the environment when the pressure inside the enclosed cavity is below the set threshold.

2. The battery pack of claim 1, wherein each valve in the set of pressure-relief valves is aligned with one gap in the set of module gaps.

3. The battery pack of claim 1, wherein each gap in the set of module gaps is aligned with two valves in the set of pressure-relief valves.

4. The battery pack of claim 3, wherein:
the set of pressure-relief valves comprises a first subset of pressure-relief valves and a second subset of pressure-relief valves,
the wall of the first portion comprises a first sidewall and a second sidewall, opposite the first sidewall,
the first subset of pressure-relief valves is positioned in and protruding through the first sidewall, and
the second subset of pressure-relief valves is positioned in and protruding through the second sidewall.

5. The battery pack of claim 1, wherein each battery module in the set of battery modules comprises a module cover, facing a gap in the set of module gaps.

6. The battery pack of claim 1, wherein each battery module in the set of battery modules comprises:
an enclosure comprising a first set of side walls, a first thermal wall, and a second thermal wall, wherein (a) the first set of side walls and the first thermal wall define a first enclosure portion, and (b) a thermal portion is defined, at least in part, by the first thermal wall and the second thermal wall collectively forming a thermal cavity therebetween; and
a first set of batteries, positioned within the first enclosure portion, surrounded by the first set of side walls, and thermally coupled to the first thermal wall.

7. The battery pack of claim 6, wherein:
the enclosure further comprises a second set of side walls, defining a second enclosure portion with the second thermal wall, and
each battery module in the set of battery modules further comprises a second set of batteries, positioned within the second enclosure portion, surrounded by the second set of side walls and thermally coupled to the second thermal wall.

8. The battery pack of claim 6, wherein at least the first set of side walls and the second thermal wall are monolithically cast as a single-cast component.

9. The battery pack of claim 8, wherein the first thermal wall is friction-stir welded to the first set of side walls.

10. The battery pack of claim 6, wherein:
each battery module in the set of battery modules comprises an inlet port and an outlet port; and
the battery pack further comprises:
a pack inlet tube fluidically coupled to the inlet port of each battery module in the set of battery modules, and
a pack outlet tube fluidically coupled to the outlet port of each battery module in the set of battery modules.

11. The battery pack of claim 10, wherein:
the battery pack further comprises a set of flow control devices selected from the group consisting of constant-flow restrictors and controllable valves, and
each of the flow control devices provides a selective fluid pathway between the pack inlet tube and the inlet port of a corresponding battery module in the set of battery modules or between the pack outlet tube and the outlet port of the corresponding battery module in the set of battery modules.

12. The battery pack of claim 11, further comprising a set of module temperature sensors configured to measure temperature at one or more locations in each battery module in the set of battery modules, wherein the set of flow control devices is controlled based on output of the set of module temperature sensors.

13. The battery pack of claim 11, further comprising a set of fluid thermocouples configured to measure temperature of a thermal fluid entering each battery module in the set of battery modules and, separately, temperature of the thermal fluid exiting each battery module in the set of battery modules, wherein the set of flow control devices is controlled based on output of the set of fluid thermocouples.

14. An electric vehicle comprising:
a vehicle frame comprising two side rails and a set of cross-members, each extending perpendicular to and interconnecting the two side rails; and
a set of battery packs, enclosed within and attached to the vehicle frame, wherein:
each pack in the set of battery packs comprises a first portion, a second portion, attached to the first portion and forming an enclosed cavity with the first portion, and a set of battery modules positioned within the enclosed cavity,
the second portion comprises a set of support assemblies, each positioned adjacent to one corner of the second portion and attached to the vehicle frame, and
each support assembly in the set of support assemblies comprises (a) a support bracket fixedly attached to the vehicle frame and (b) a support bushing fixedly attached to the second portion and attached to the support bracket.

15. The electric vehicle of claim 14, wherein the support bushing comprises:
a rigid bushing enclosure bolted to the second portion of each pack in the set of battery packs, and
an elastomeric bushing supported and surrounded by the rigid bushing enclosure.

16. The electric vehicle of claim 15, wherein the support bushing is pivotably attached to the support bracket by a support bolt that protrudes through the elastomeric bushing.

17. The electric vehicle of claim 14, wherein:
each pack in the set of battery packs further comprises a set of pressure-relief valves positioned in and protruding through a wall of the first portion, and
each valve in the set of pressure-relief valves is configured to provide a fluid path from the enclosed cavity to environment outside of the battery pack when pressure inside the enclosed cavity is at or exceeds a set threshold and is further configured to fluidically isolate the enclosed cavity from the environment when the pressure inside the enclosed cavity is below the set threshold.

18. The electric vehicle of claim 14, wherein:
each battery module in the set of battery modules comprises an inlet port and an outlet port; and
each pack in the set of battery packs further comprises:
a pack inlet tube fluidically coupled to the inlet port of each battery module in the set of battery modules, and
a pack outlet tube fluidically coupled to the outlet port of each battery module in the set of battery modules.

19. The electric vehicle of claim 14, wherein each pack in the set of battery packs further is positioned between the two side rails of the vehicle frame.

20. The electric vehicle of claim 14, wherein the support bracket is fixedly attached to one cross-member in the set of cross-members of the vehicle frame.

\* \* \* \* \*